US009192146B2

(12) United States Patent
Trogdon

(10) Patent No.: US 9,192,146 B2
(45) Date of Patent: Nov. 24, 2015

(54) BIRDFEEDER APPARATUS

(71) Applicant: Peter Whitehouse Trogdon, Severna Park, MD (US)

(72) Inventor: Peter Whitehouse Trogdon, Severna Park, MD (US)

(*) Notice: Subject to any disclaimer, the term of this patent is extended or adjusted under 35 U.S.C. 154(b) by 52 days.

(21) Appl. No.: 14/252,128

(22) Filed: Apr. 14, 2014

(65) Prior Publication Data

US 2014/0305373 A1    Oct. 16, 2014

Related U.S. Application Data

(60) Provisional application No. 61/811,482, filed on Apr. 12, 2013.

(51) Int. Cl.
*A01K 39/01* (2006.01)
*A01K 39/012* (2006.01)

(52) U.S. Cl.
CPC ..................... *A01K 39/012* (2013.01)

(58) Field of Classification Search
CPC .............................. A01K 39/012; A01K 39/01
USPC ........... 119/51.01, 52.2, 52.3, 57.8, 57.9, 468
See application file for complete search history.

(56) References Cited

U.S. PATENT DOCUMENTS

| | | | | |
|---|---|---|---|---|
| 4,201,155 A | * | 5/1980 | Hyde, Jr. ..................... | 119/57.8 |
| 4,215,652 A | * | 8/1980 | Kerscher ..................... | 119/57.8 |
| 4,261,294 A | | 4/1981 | Bescherer | |
| 4,361,116 A | | 11/1982 | Kilham | |
| D291,610 S | | 8/1987 | Metzner | |
| 4,838,205 A | | 6/1989 | Larson | |
| 5,215,039 A | * | 6/1993 | Bescherer ..................... | 119/57.8 |
| 5,483,922 A | | 1/1996 | Hall | |
| D385,067 S | | 10/1997 | Whittles | |
| 6,363,886 B1 | | 4/2002 | Statton | |
| 6,581,891 B1 | | 6/2003 | Byrd | |
| D477,117 S | | 7/2003 | Stokes et al. | |
| 6,830,009 B1 | | 12/2004 | Kuelbs | |

(Continued)

FOREIGN PATENT DOCUMENTS

| | | |
|---|---|---|
| CA | 2153924 | 1/1997 |
| CN | 86203352 | 1/1997 |

(Continued)

OTHER PUBLICATIONS

Suction-Grip Bird Feeder Lets You Admire Nature'Species Close-up: Suction-Grip Window View Bird Feeder with Thermometer. May 2, 2006.

(Continued)

*Primary Examiner* — Yvonne Abbott-Lewis
(74) *Attorney, Agent, or Firm* — Belles Katz LLC

(57) ABSTRACT

A birdfeeder apparatus that includes a tubular housing having an inner surface that defines an internal cavity. A plate having a first major surface and an opposing second major surface is positioned within the internal cavity. The plate divides the internal cavity into a first chamber that is termed by the first major surface of the plate and a first portion of the inner surface of the tubular housing and a second chamber that is formed by the second major surface of the plate and a second portion of the inner surface of the tubular housing. A gauge mechanism for measuring a desired standard is coupled to the first major surface of the plate. The plate permits a food substance that is inserted into the internal cavity to enter into the second chamber and prevents the food substance from entering into the first chamber.

20 Claims, 18 Drawing Sheets

(56) References Cited

U.S. PATENT DOCUMENTS

| | | | |
|---|---|---|---|
| D539,991 S | 4/2007 | Petrie et al. | |
| D572,866 S | 7/2008 | Bloedorn | |
| 7,530,330 B1 | 5/2009 | Valle | |
| 8,863,690 B2 * | 10/2014 | Podmaniczky et al. | 119/57.8 |
| 8,985,053 B2 * | 3/2015 | Wood et al. | 119/57.8 |
| 2004/0144328 A1 | 7/2004 | Bonner et al. | |
| 2008/0210172 A1 | 9/2008 | Waikas | |
| 2012/0048203 A1 | 3/2012 | Bonham | |
| 2012/0192796 A1 | 8/2012 | Saunders et al. | |
| 2012/0272571 A1 | 11/2012 | Rex | |

FOREIGN PATENT DOCUMENTS

| | | |
|---|---|---|
| CN | 201315791 | 9/2009 |
| CN | 202857529 | 4/2013 |
| DE | 10215513 | 8/2003 |
| RU | 2169461 | 6/2001 |

OTHER PUBLICATIONS

'Fairy Garden Patio Deck Decor Thermometer Bird Bath Bird Feeder', PopScreen, Inc., 2014.
Amazon.com,Inc., 'Gablemere Bird Feeder Clock with Thermometer 11.5cm'.
SongbirdGarden.com, Grande View Bird Feeder Thermometer.
gardens2you.co.uk, "Steel House Shaped Thermometer & Hygrometer on a Stake Garden Accessory".
Etsy, Inc. 2014, "Repurposed Upcycled Recycled Bird Feeder Dust Pan Copper Silver Vintage Thermometer Found Items".
Rays Goodies, 'Squirel/Bird Feeder—Thermometer Indoor/Outdoor—Hanging/Sitting', Aug. 30, 2012.
Ebay, Inc., Temperature Gauge Bird Feeder.
Foster and Smith, Inc., 'Thermometer Window Hanger'.

* cited by examiner

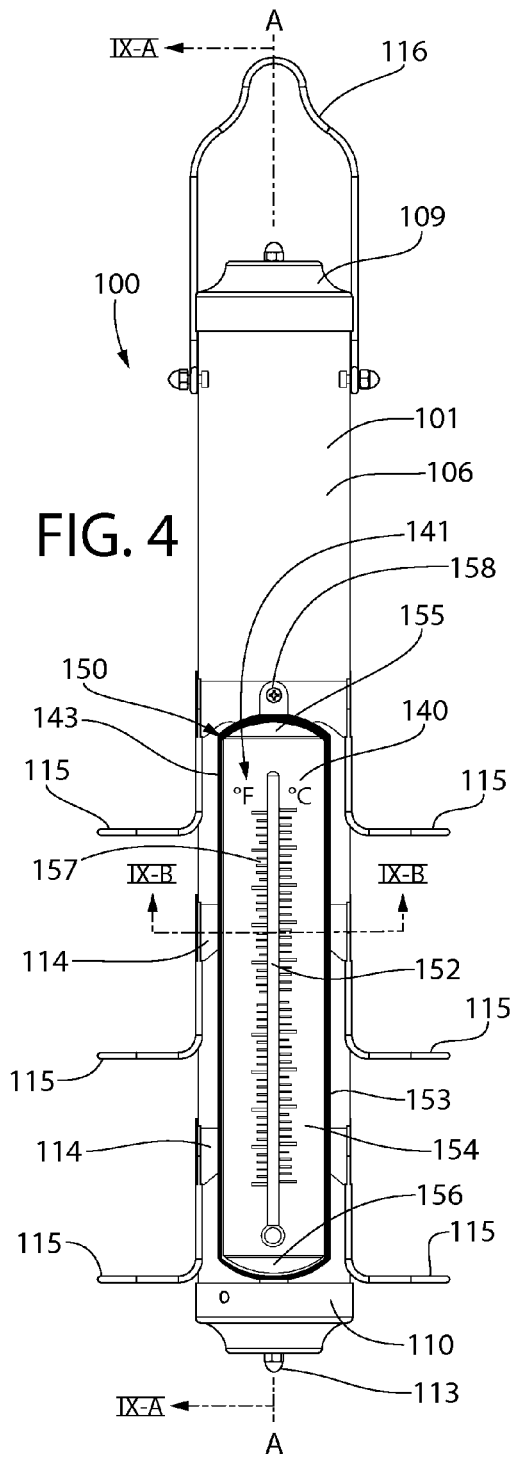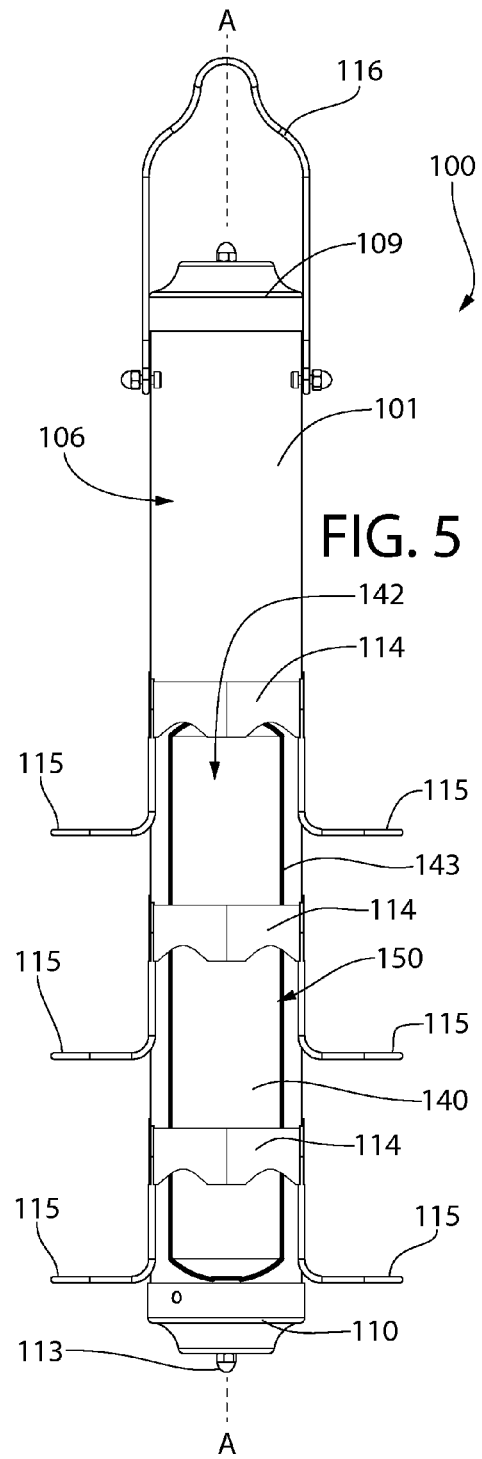

US 9,192,146 B2

BIRDFEEDER APPARATUS

CROSS-REFERENCE TO RELATED APPLICATIONS

The present application claims the benefit of U.S. Provisional Patent Application Ser. No. 61/811,482, filed on Apr. 12, 2013, the entirety of which is incorporated herein by reference.

FIELD OF THE INVENTION

The present invention relates generally to a birdfeeder apparatus, and more specifically to a birdfeeder apparatus that includes a gauge mechanism for measuring a desired standard.

BACKGROUND OF THE INVENTION

Many people get enjoyment out of placing birdfeeders outside of their homes in their yards. Birdfeeders attract birds, which can be pleasant and relaxing to watch. In fact, bird watching has become a popular recreational activity in recent years. Additionally, it is often desirable for people to have a thermometer outside of their homes so that they know the outdoor temperature.

Combining thermometers and bud feeders has previously been attempted. However, such combined birdfeeder thermometers simply email affixing a sticker-type thermometer to a birdfeeder or the like. Thus, a need exists for a more durable birdfeeder with thermometer. Furthermore, a need exists for a birdfeeder with a thermometer such that a food substance in the birdfeeder does not block the view of the thermometer. These and other needs are met by the present invention, discussed in detail below.

SUMMARY OF THE INVENTION

Exemplary embodiments according to the present invention are directed to a birdfeeder apparatus that includes a tubular housing having an inner surface that defines an internal cavity. A plate having a first major surface and an opposing second major surface is positioned within the internal cavity. The plate divides the internal cavity into a first chamber that is formed by the first major surface of the plate and a first portion of the inner surface of the tubular housing and a second chamber that is formed by the second major surface of the plate and a second portion of the inner surface of the tubular housing. A gauge mechanism for measuring a desired standard is coupled to the first major surface of the plate. The plate permits a food substance that is inserted into the internal cavity to enter into the second chamber and prevents the food substance from entering into the first chamber.

In one aspect, the invention can be a birdfeeder apparatus comprising: a tubular housing extending along a longitudinal axis, the tubular housing haying an inner surface that defines an internal cavity; a plate having a first major surface and an opposing second major surface positioned within the internal cavity, the plate dividing the internal cavity into a first chamber that is formed by the first major surface of the plate and a first portion of the inner surface of the tubular housing and a second chamber that is formed by the second major surface of the plate and a second portion of the inner surface of the tubular housing; a gauge mechanism for measuring a desired standard coupled to the first major surface of the plate; and wherein a food substance that is inserted into the internal cavity enters into the second chamber and is prevented from entering into the first chamber.

In another aspect, the invention can be a birdfeeder apparatus comprising: a tubular housing having an inner surface that defines an internal cavity; a plate having a front surface and an opposing rear snake positioned within the internal cavity and dividing the internal cavity into a first chamber that is partially bounded by the front surface of the plate and a second chamber that is partially bounded by the rear surface of the plate; a gauge mechanism for measuring a desired standard coupled to the front surface of the plate; and wherein a food substance that is inserted into the internal cavity enters into the second chamber and is prevented from entering into the first chamber.

In yet another aspect, the invention can be a birdfeeder apparatus comprising: a tubular housing extending along a longitudinal axis, the tubular housing having an inner surface that defines an internal cavity and an outer surface; a first collar having a first chamber and a second chamber, a top portion of the tubular housing positioned within the first chamber of the first collar; a second collar having a first chamber and a second chamber, a bottom portion of the tubular housing positioned within the first chamber of the second collar; a plate having a first major surface and an opposing second major surface, the second major surface of the plate positioned adjacent to the outer surface of the tubular housing, a top portion of the plate positioned within the second chamber of the first collar and a bottom portion of the plate positioned within the second chamber of the second collar; and a gauge mechanism for measuring a desired standard coupled to the first major surface of the plate.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures:

FIG. 4 is a front view of the birdfeeder of FIG. 1;

FIG. 5 is a rear view of the birdfeeder of FIG. 1;

DETAILED DESCRIPTION OF THE INVENTION

Figure 1:
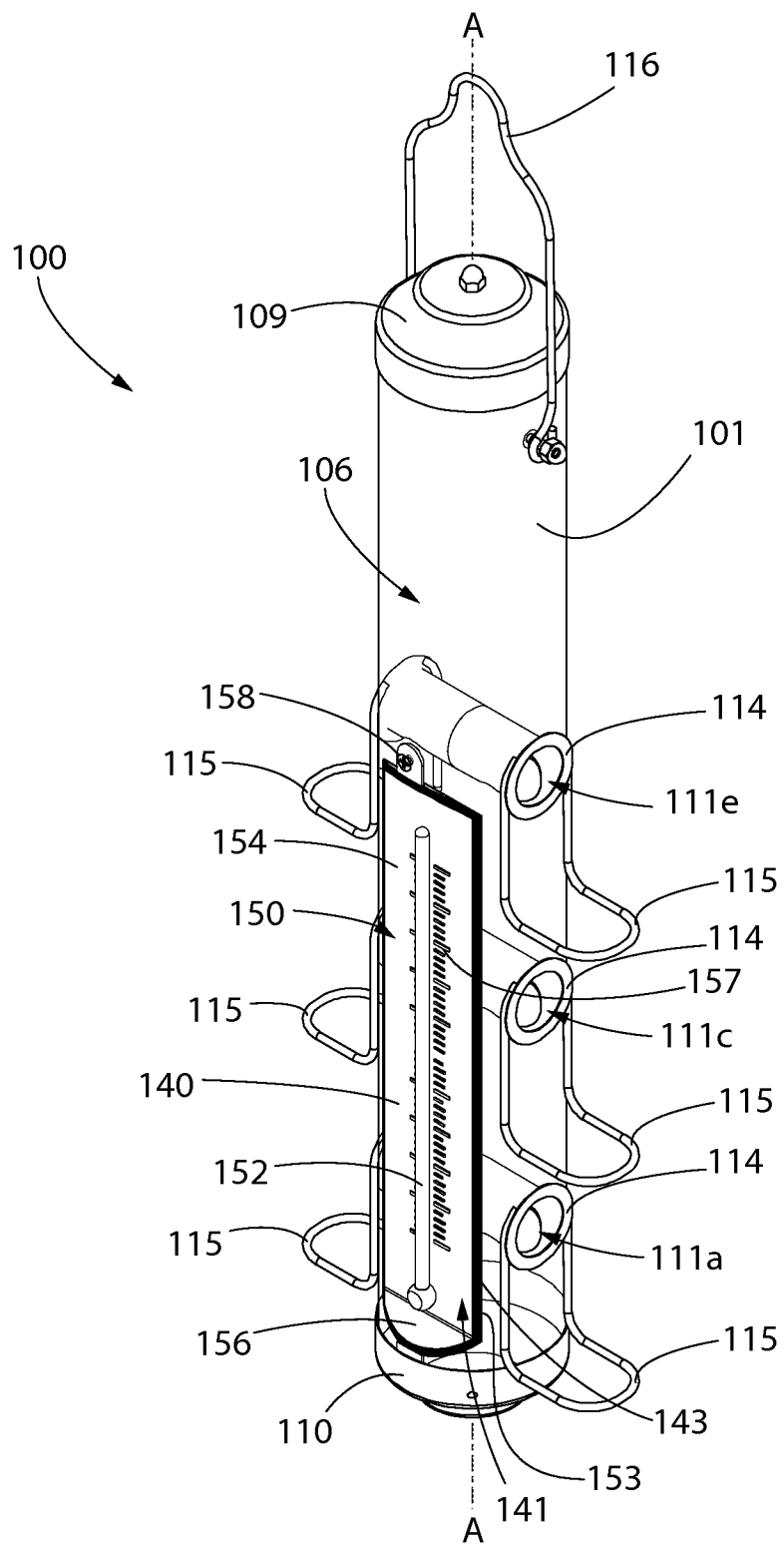
FIG. 1 is a front top perspective view of a birdfeeder in accordance with a first embodiment of the present invention.
Figure 2:
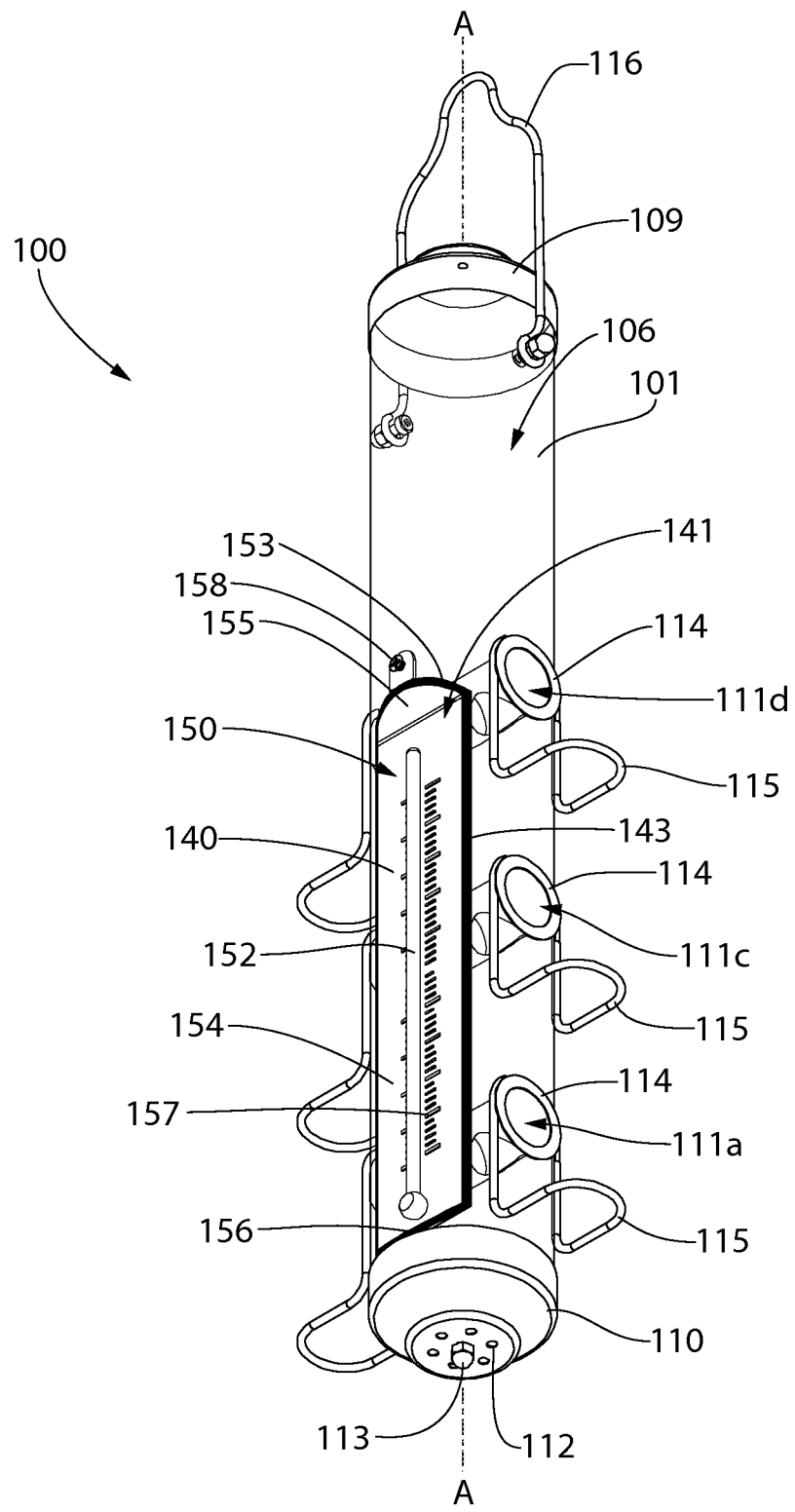
FIG. 2 is a front bottom perspective view of the bird feeder of FIG. 1.
Figure 3:
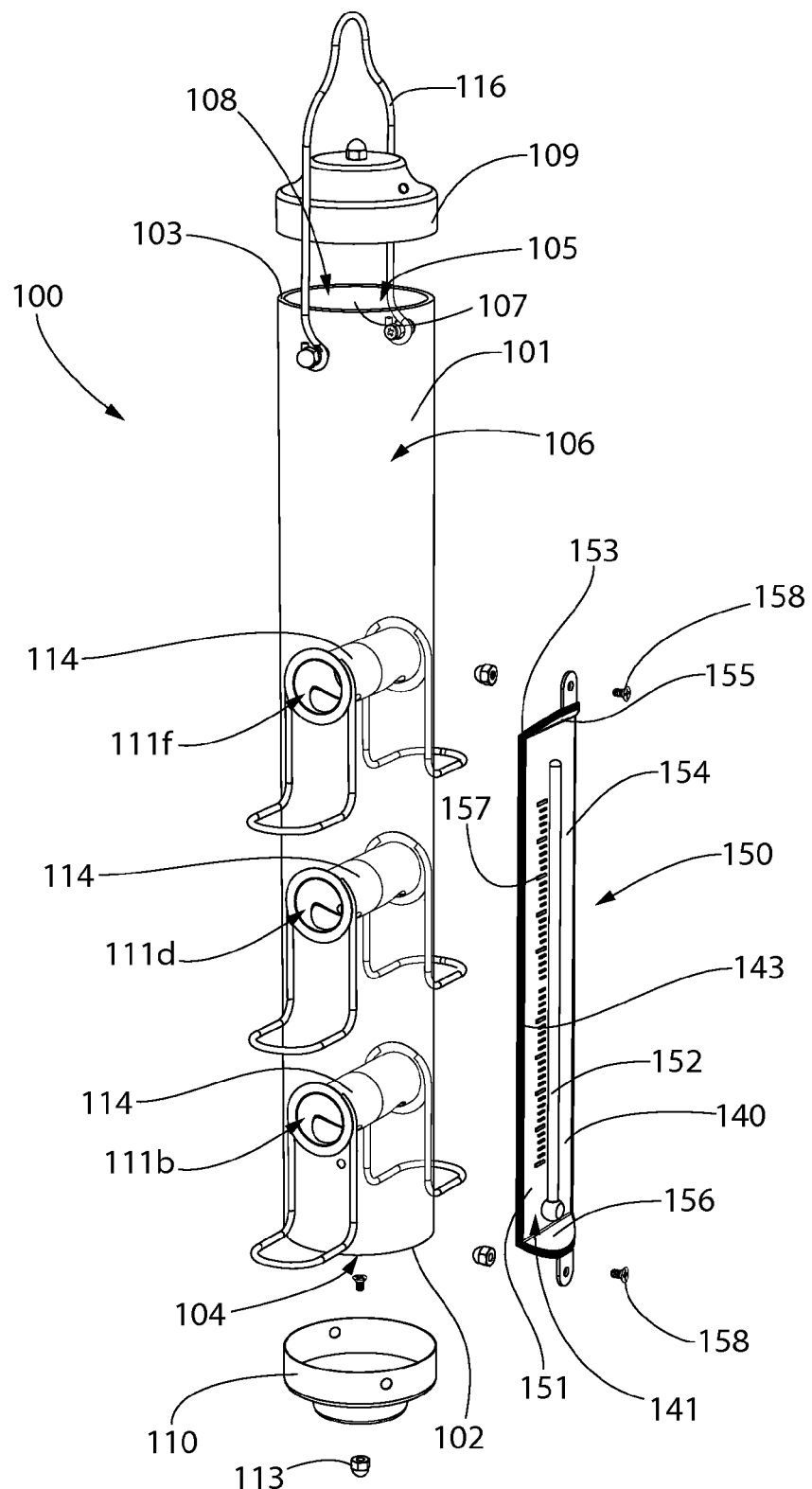
FIG. 3 is an exploded view of the birdfeeder of FIG. 1.
Figure 6:
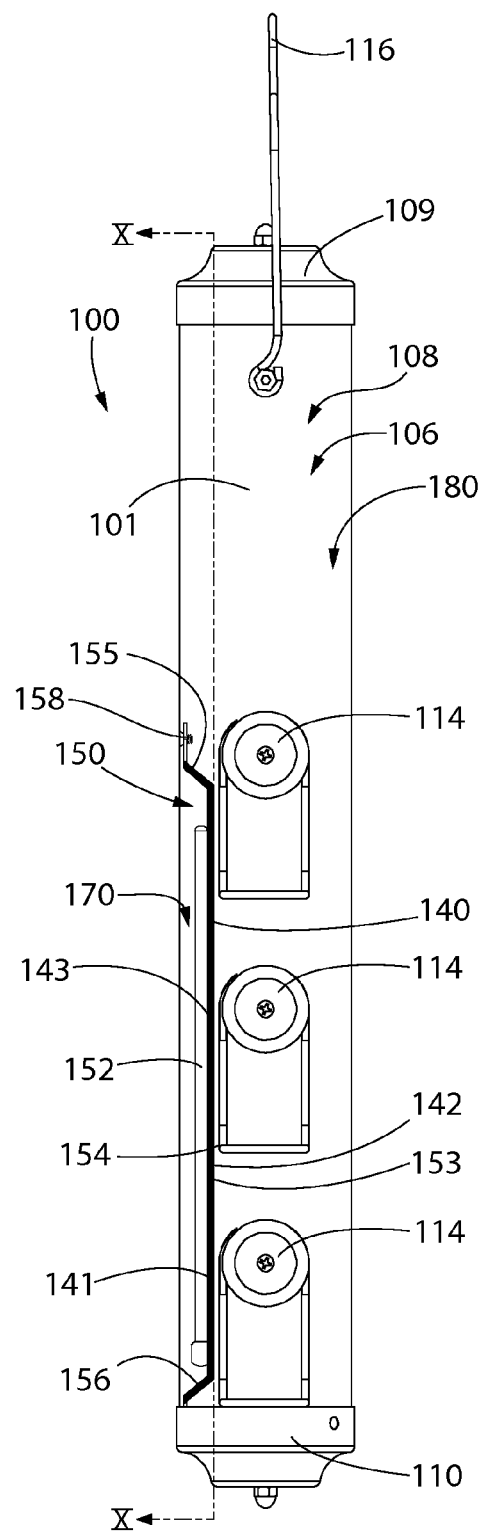
FIG. 6 is a left-side view of the birdfeeder of FIG. 1.
Figure 7:
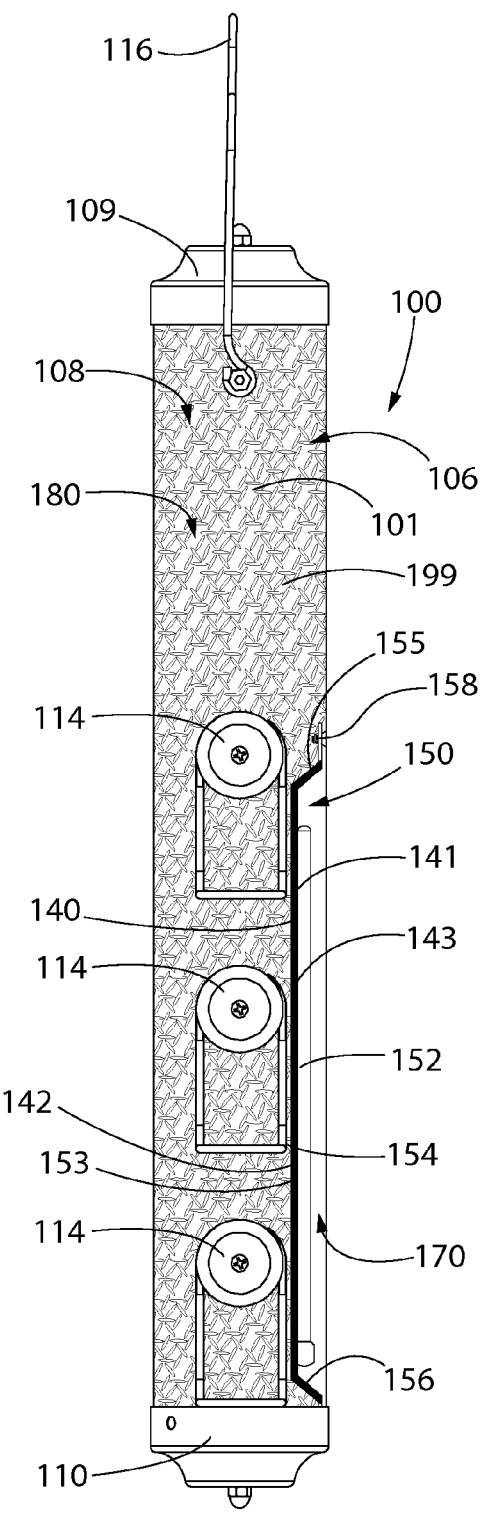
FIG. 7 is a right-side view of the birdfeeder of FIG. 1 with a food substance therein.
Figure 8:
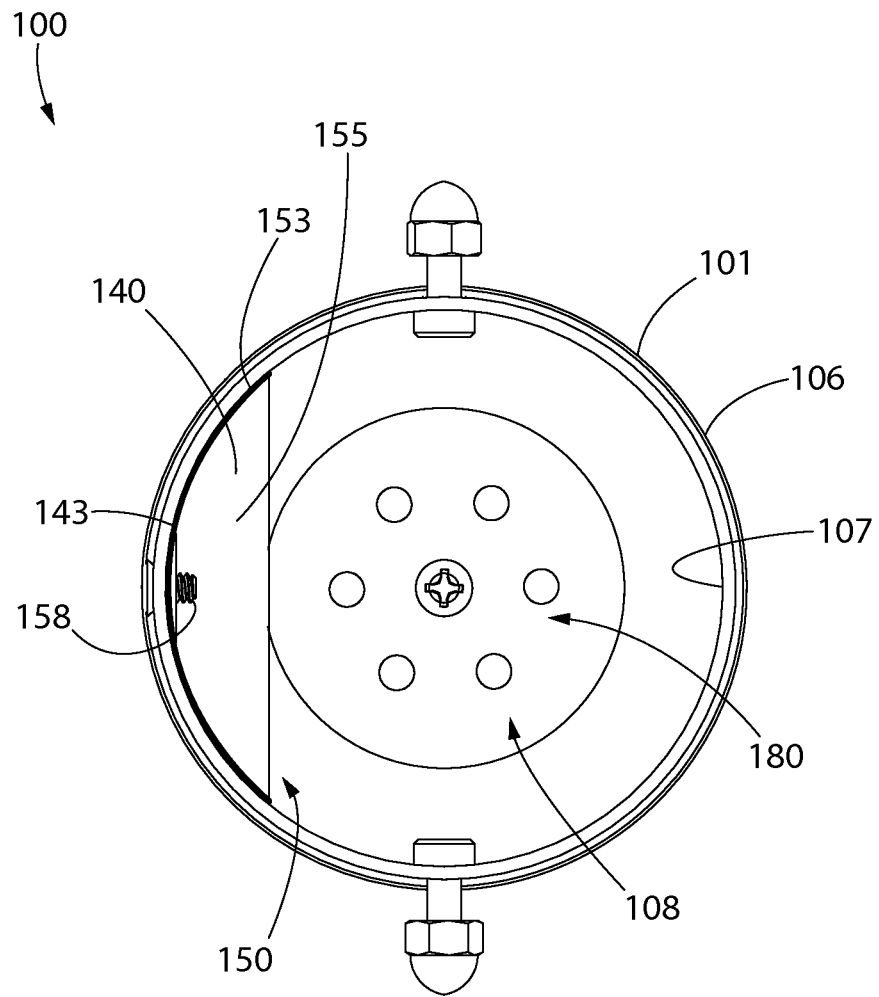
FIG. 8 is a top view of the birdfeeder of FIG. 1 with a first cap and feed inserts removed.
Figure 9A:
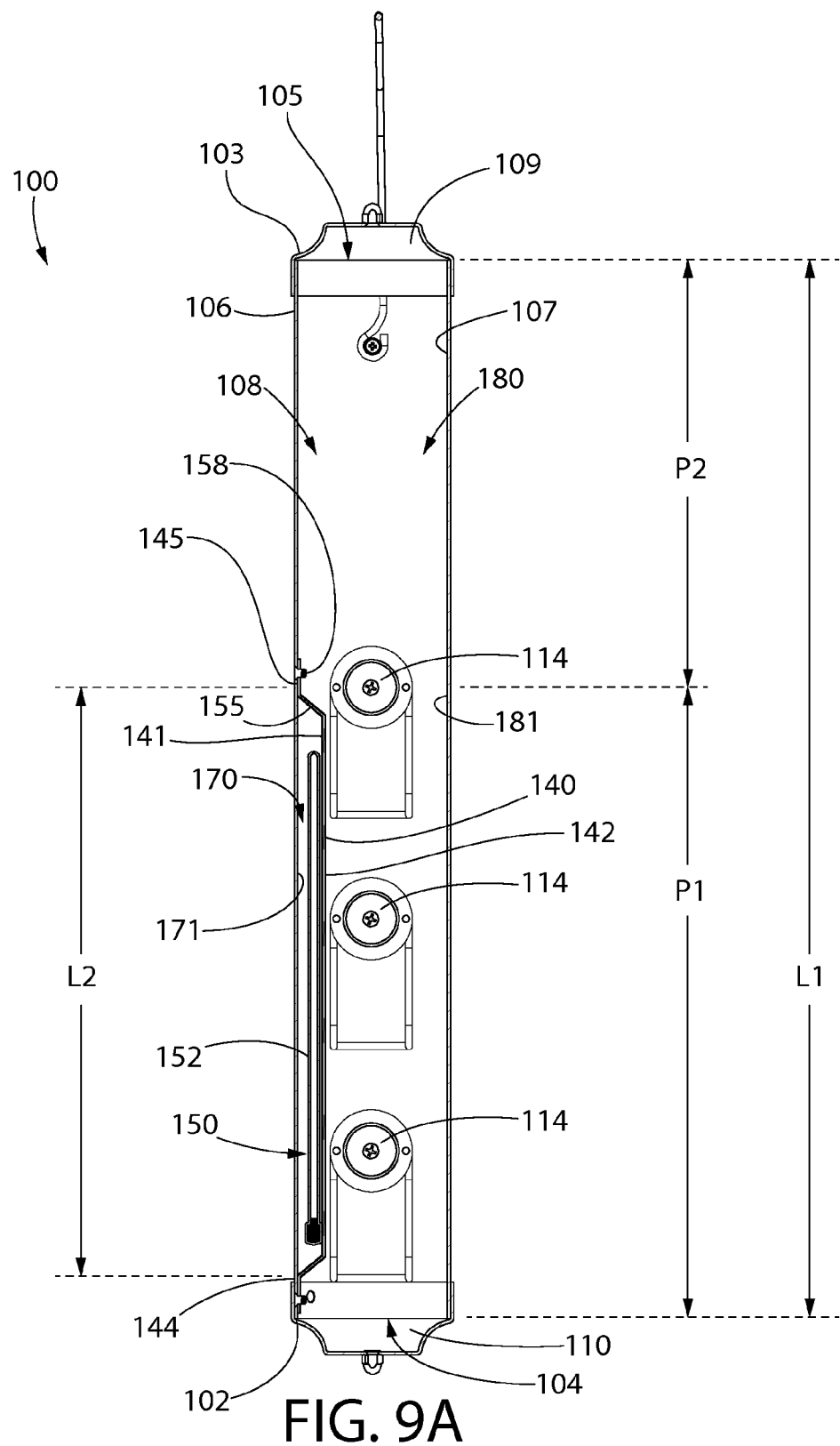
FIG. 9A is a cross-sectional view through line IXA-IXA of FIG. 4.
Figure 9B:
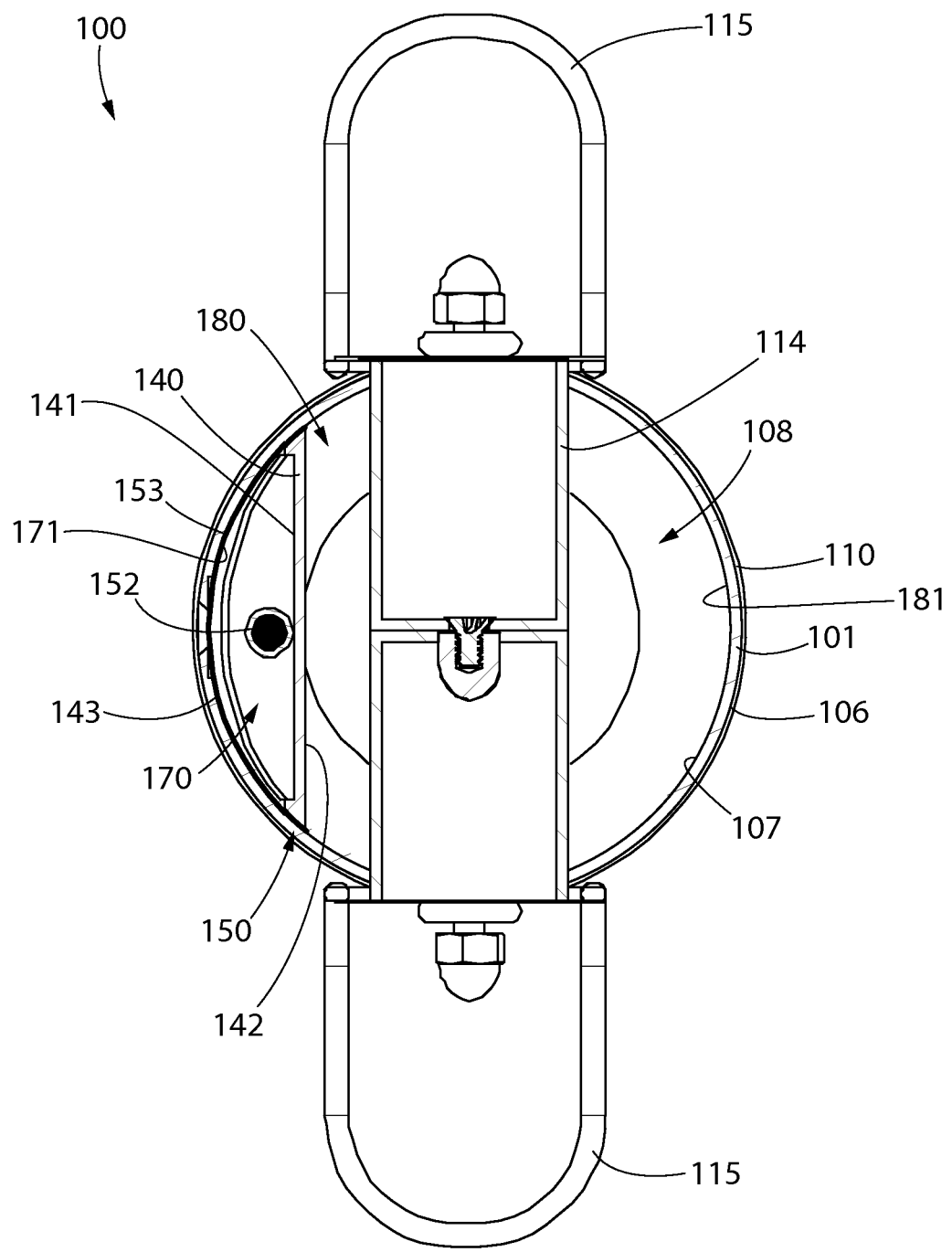
FIG. 9B is an enlarged cross-sectional view through line IXB-IXB of FIG. 4.
Figure 10:
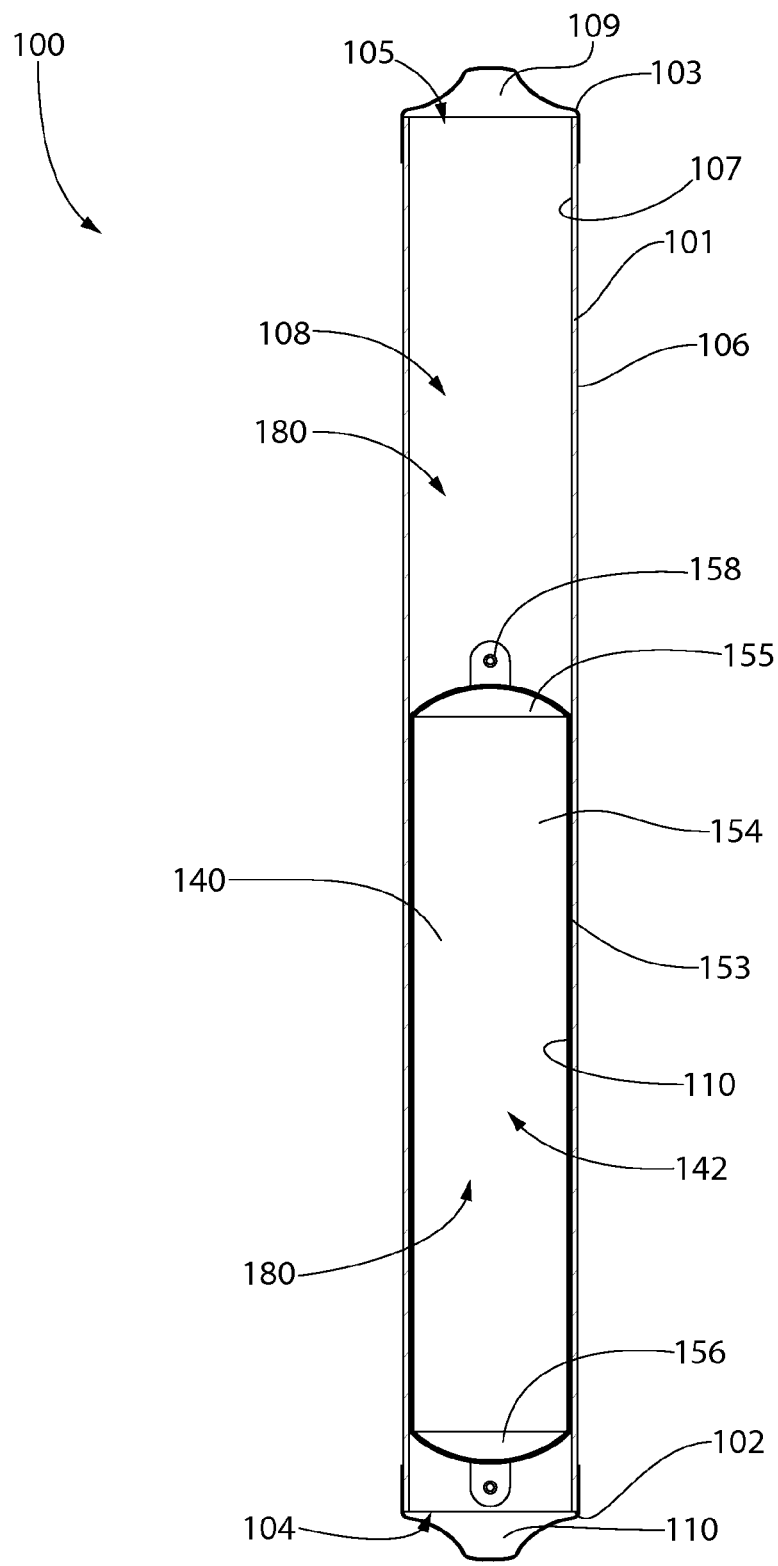
FIG. 10 is a cross-sectional view through line X-X of FIG. 6.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled" "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

Referring to FIGS. 1-7 concurrently, a birdfeeder 100 will be described in accordance with an embodiment of the present invention. The birdfeeder 100 generally comprises a tubular housing 101 having a bottom edge 102 and a top edge 103. The bottom edge 102 defines and surrounds a bottom opening 104 formed into the bottom end of the tubular housing 101 and the top edge 103 defines and surrounds a top opening 105 formed into the top end of the tubular housing 101. The tubular housing 101 extends along a longitudinal axis A-A from the bottom edge 102 to the top edge 103. In the exemplified embodiment, the tubular housing 101 has a cylindrical shape. However, the invention is not to be so limited and the tubular housing 101 can take on any shape, such as, for example without limitation, cube-shaped, pyramid-shaped, cone-shaped, triangular prism-shaped or the like.

The tubular housing 101 has an outer surface 106 and an inner surface 107. The inner surface 107 defines an internal cavity 108. The openings 104, 105 in the bottom and top ends of the tubular housing 101 form passageways into the internal cavity 108 from the external environment. As will be appreciated from the discussion below, the tubular housing 101 of the birdfeeder 100 is intended to house or retain a food substance for feeding birds or other animals. Thus, the openings 104, 105 in the bottom and top ends of the tubular housing 101 provide a location at which the food substance can be inserted into the internal cavity 108 to fill the internal cavity 108 with the food substance.

In the exemplified embodiment, the tubular housing 101 is formed of a rigid plastic material. Furthermore, in certain embodiments the tubular housing 101 is formed of a clear or transparent material. Forming the tubular housing 101 out of a clear or transparent material enables a user to view into the internal cavity 108 to determine when it is necessary to refill the tubular housing 101 with additional food substance. Furthermore, as will be appreciated from the discussion below, forming the tubular housing 101 out of a clear or transparent material enables a user to view a gauge mechanism that measures a desired standard that is disposed within the internal cavity 108. However, the invention is not to be so limited and in certain other embodiments the tubular housing 101 (or portions thereof) can be formed of a colored plastic, an opaque plastic, or a plastic having a design thereon, such as a design of the wilderness, trees, birds or the like to create a desired aesthetic appeal.

In certain embodiments, the tubular housing 101 of the birdfeeder 100 is formed of a durable UV stabilized polycarbonate that resists yellowing from the elements. However, the invention is not to be so limited and the tubular housing 101 can be formed of any other plastic material that is commonly used for tube-shaped bird feeders. In certain embodiments the tubular housing 101 can be formed of materials other than plastic, such as wood, metal or the like.

The birdfeeder 100 comprises a first cap 109 that is sized and shaped to close the top opening 105 at the top end of the tubular housing 101 and a second cap 110 that is sized and shaped to close the bottom opening 104 at the bottom end of the tubular housing 101. In the exemplified embodiment, the second cap 110 can be coupled to the bottom end of the tubular housing 101 using an interference fit and a plurality of threaded screws, bolts or other types of fasteners. The fasteners will ensure that the second cap 110 does not become separated from the tubular housing 101 when the tubular housing 101 is hanging vertically from a tree or at another location. Of course, the fasteners can be omitted and the second cap 110 may be coupled to the tubular housing 101 using only an interference fit or other tight fit arrangement.

In the exemplified embodiment, the first cap 109 is removably couplable to the tubular housing 101 by an interference or tight fit without the additional use of fasteners. In certain embodiments, the first cap 109 may have an inner diameter that is slightly larger than the outer diameter of the tubular housing 101. Thus, the first cap 109 can be easily separated from the tubular housing 101 by pulling on the first cap 109 and the tubular housing 101 in opposite directions. Of course, the invention is not to be so limited in all embodiments and the first cap 109 can be affixed to the tubular housing 101 using fasteners, screws, hook and loop, adhesive or the like in other embodiments.

This ease of separation of the first cap 109 from the tubular housing 101 streamlines the process of refilling the internal cavity 108 of the tubular housing 101 with a food substance as desired. Specifically, when the first cap 109 is separated from the tubular housing 101, the top opening 105 is exposed and the internal cavity 108 of the tubular housing 101 can be filled with a food substance. The food substance may be a bird food such as millet, sunflower, safflower, nyjer seed, rapeseed, canola seed, black-oil sunflower seed, white proso millet, peanuts, suet cakes, cracked corn, fruit, crushed eggshells or the like as desired. The food substance may alternatively be a squirrel food, a raccoon food, or any other food that can be used to feed a specific animal or a range of animals as desired.

In certain embodiments the food substance may be a liquid food, such as nectar, sugar water, honey or the like. Thus, the food substance is not limited to being a hard or pellet-type food, but may also include grains, liquids and other fluid-type foods as desired (such as for feeding hummingbirds). When the top opening 105 is exposed due to the first cap 109 being separated from the tubular housing 101, the internal cavity 108 may be tilled with the food substance by pouring or flowing the food substance into the internal cavity 108 through the top opening 105 of the tubular housing 101.

In the exemplified embodiment, the second cap 110 is formed with holes or apertures 112 therein to facilitate drainage. Specifically, if rain water enters into the tubular housing 101 (such as through the feeding holes that will be discussed in more detail below), the rain water will drain through the second cap 110 via the holes 112. The second cap 110 also includes a nut 114 coupled thereto so that a seed saver tray or large bird perch can optionally be added to the birdfeeder 100 if desired.

In the exemplified embodiment, the tubular housing 101 has a plurality of holes 111 formed therein that serve as ports at which birds and other animals can access the food substance retained within the internal cavity 108. Specifically, each of the holes 111 forms a passageway from an external environment into the internal cavity 108 so that an animal can eat a food substance that is housed in the internal cavity 108. Thus, each of the holes 111 forms a feeding port.

In the exemplified embodiment, the tubular housing 101 has a first hole 111a, a third hole 111c and a fifth hole 111e that are positioned on a first side of the longitudinal axis A-A and that are longitudinally aligned with one another. The tubular housing 101 also has a second hole 111b, a fourth hole 111d and a sixth hole 111f that are positioned on a second opposite side of the longitudinal axis A-A. The second, fourth and sixth holes 111b, 111d, 111f are also longitudinally aligned with one another. In the exemplified embodiment, the first and second holes 111a, 111b are circumferentially spaced apart by 180°, the third and fourth holes 111c, 111d are circumferentially spaced apart by 180°, and the fifth and sixth holes 111e, 111f are circumferentially spaced apart by 180°. Of course, the holes 111a-f can be positioned at other locations than that which is depicted in the figures in other embodiments, and more or less than six holes can be used in other embodiments.

The first and second holes 111a, 111b form a first pair of holes, the third and fourth holes 111c, 111d form a second pair of holes, and the fifth and sixth holes 111e, 111f form a third pair of holes. A feed insert 114 is inserted within each of the pairs of holes. Each of the feed inserts 114 comprises a cylindrical portion that extends transversely through the internal cavity 108 between each of the pairs of holes. Each of the feed inserts 114 has an opening at the holes 111a-f so that the feed insert 114 does not close the holes 111a-f. Furthermore, each of the feed inserts 114 comprises a ledge 115 upon which birds or other animals can perch or stand when eating the food substance out of the internal cavity 108 of the birdfeeder 100.

In certain embodiments, the first cap 109, the second cap 110 and the feed inserts 114 may be formed of a metal, such as for example without limitation an anodized aluminum having any desired finish including a bronze patina. Of course, the invention is not to be so limited and one or more of the first cap 109, the second cap 110 and the feed inserts 114 can be formed of a plastic or other material in other embodiments. The birdfeeder 100 also includes a hanger 116 for hanging the birdfeeder 100 from a tree, a wire hanger, a shepherd hook or other location. In preferred embodiments, the hanger 116 is also formed of a metal material and is hung from two wires at the shoulders to reduce spin of the bird feeder 100 for better viewing.

Referring now to FIGS. 1-10 concurrently, the birdfeeder 100 will be further described. The birdfeeder 100 comprises a plate 140 positioned within the internal cavity 108 of the tubular housing 101. The plate 140 comprises a first major surface 141 and an opposing second major surface 142. In certain embodiments, the first major surface 141 may be considered a front surface of the plate 140 and the second major surface 142 may be considered a rear surface of the plate 140. The plate 140 is positioned within the internal cavity 108 so as to divide the internal cavity 108 into a first chamber 170 and a second chamber 180. In certain embodiments, the first chamber 170 may be considered the gauge reading chamber and the second chamber 180 may be considered the feed chamber. The first chamber 170 is formed by the first major surface 141 of the plate 140 and a first portion 171 of the inner surface 108 of the tubular housing 101. Thus, the first major surface 141 of the plate 140 and the first portion 171 of the inner surface 108 of the tubular housing 101 collectively define the bounds of the first chamber 170. The second chamber 180 is formed by the second major surface 142 of the plate 140 and a second portion 181 of the inner surface 108 of the tubular housing 101. Thus, the second major surface 142 of the plate 140 and the second portion 181 of the inner surface 108 of the tubular housing 101 collectively define the bounds of the second chamber 180.

The plate 140 divides the internal cavity 108 into the first and second chambers 170, 180 so that the first and second chambers 170, 180 are completely separate and isolated from one another. In that regard, in the exemplified embodiment the plate 140 comprises a perimetric edge 143 that is in surface contact with the inner surface 107 of the tubular housing 101. Specifically, the perimetric edge 143 of the plate 140 is the edge of the plate 140 that extends between the first and second major surfaces 141, 142 of the plate 140 around the entire perimeter of the plate 140. In the exemplified embodiment, the entirety of the perimetric edge 143 of the plate 140 is in intimate surface contact with the inner surface 107 of the tubular housing 101 to properly separate and isolate the first and second chambers 170, 180 from one another.

Furthermore, in the exemplified embodiment a gasket 153 is coupled to the plate 140 about the entirety of the perimetric edge 143 of the plate 140. The gasket 153 may be formed of an elastomeric material, such as a thermoplastic elastomer, a rubber, or any other material that will facilitate the sealing of the plate 140 to the inner surface 107 of the tubular housing 101. Specifically, the gasket 153 is preferably formed of a material that is to some degree yielding or resilient so that it is able to deform and tightly seal against the inner surface 107 of the tubular housing 101. Thus, in the exemplified embodiment it is the gasket 153 that is in intimate surface contact with the inner surface 107 of the tubular housing 101 so maintain the separation between the first and second chambers 170, 180.

In some embodiments, when the gasket 153 is positioned around the perimetric edge 143 of the plate, the first and second chambers 170, 180 may be hermetically sealed relative to one another. However, the invention is not to be so limited in all embodiments and in other embodiments the first and second chambers 170, 180 are merely separated from one another by the plate 140 (and possibly also the gasket 153) so that when a food substance is poured into the cavity 108, the food substance is only able to enter into the first chamber 170, but is prevented from entering into the second chamber 180. Thus, due to the abutting surface contact between the perimetric edge 143 of the plate 140 (and possible also the gasket 153) and the inner surface 107 of the tubular housing 101, a food substance is unable to enter into the second chamber 180. Of course, in certain embodiments it should be appreciated that the first and second chambers 170, 180 are separate so that a majority of the food substance is prevented from entering into the first chamber 170 (although in some embodiments it is possible that a small amount of the food substance may find its way into the first chamber 170).

Of course, the gasket 153 may be omitted in other embodiments because it is not always necessary that the first and second chambers 170, 180 be completely isolated and sealed relative to one another. Specifically, in certain embodiments it is merely preferable that the plate 140 permits the food substance to enter into the second chamber 180 while preventing the food substance from entering into the first chamber 170. This may be achieved even if the perimetric edge 143 of the plate 140 does not form a hermetic-type seal depending on the size of the food substance particles or even if small gaps are present between the perimetric edge 143 of the plate 140 and the inner surface 107 of the tubular housing 101.

Figure 11:
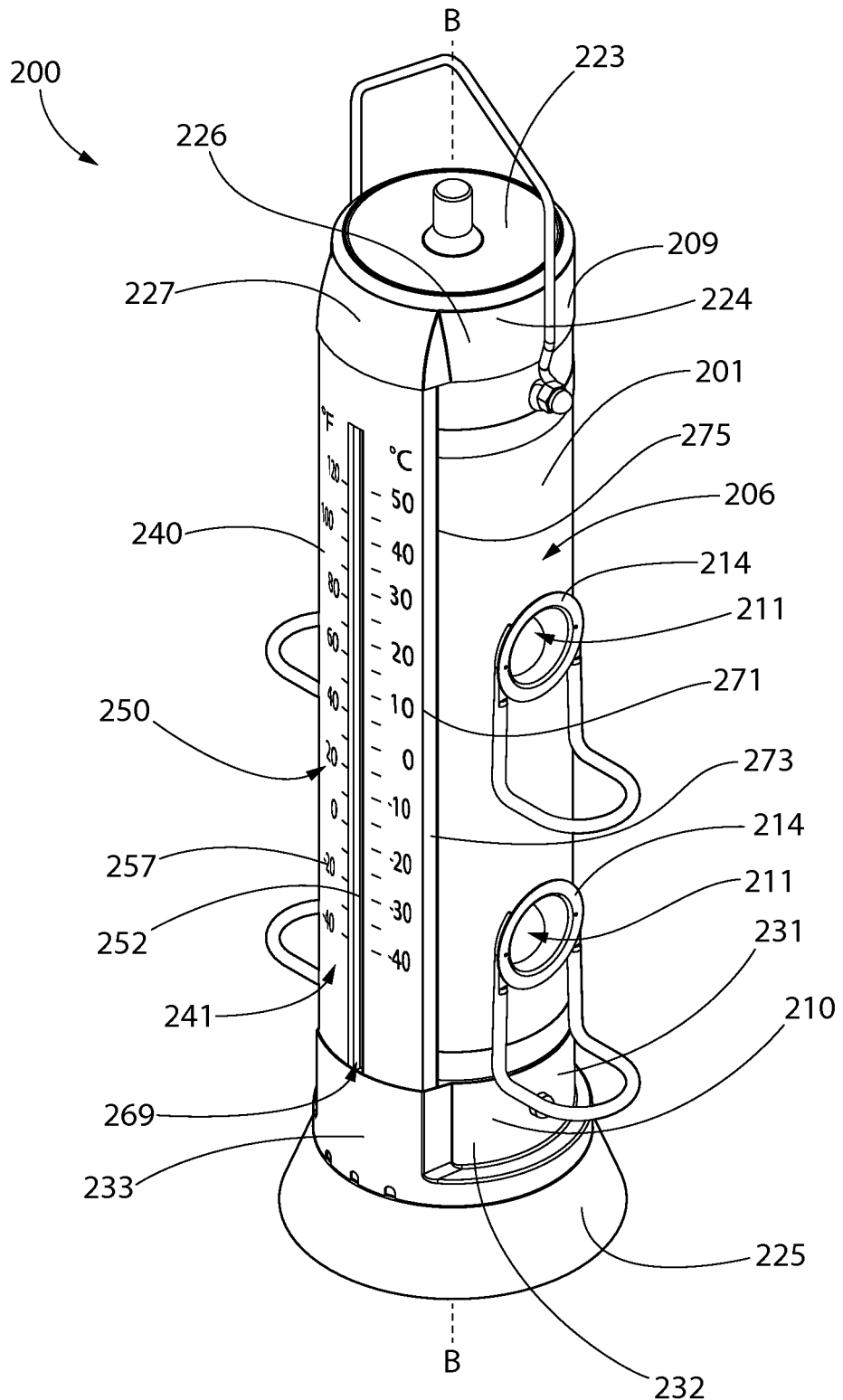
FIG. 11 is a front top perspective view of a birdfeeder in accordance with a second embodiment of the present invention.
Figure 12:
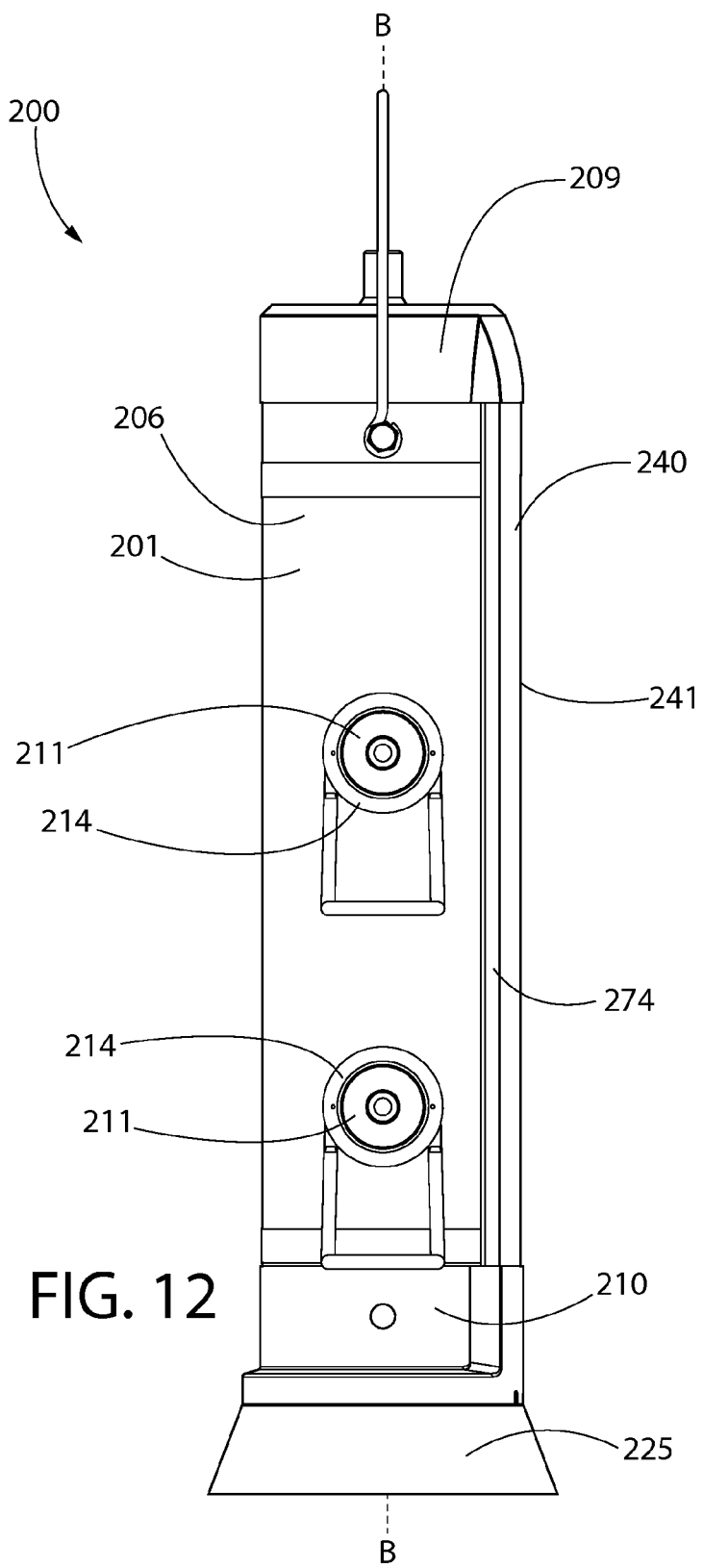
FIG. 12 is a right-side view of the birdfeeder of FIG. 11.
Figure 13:
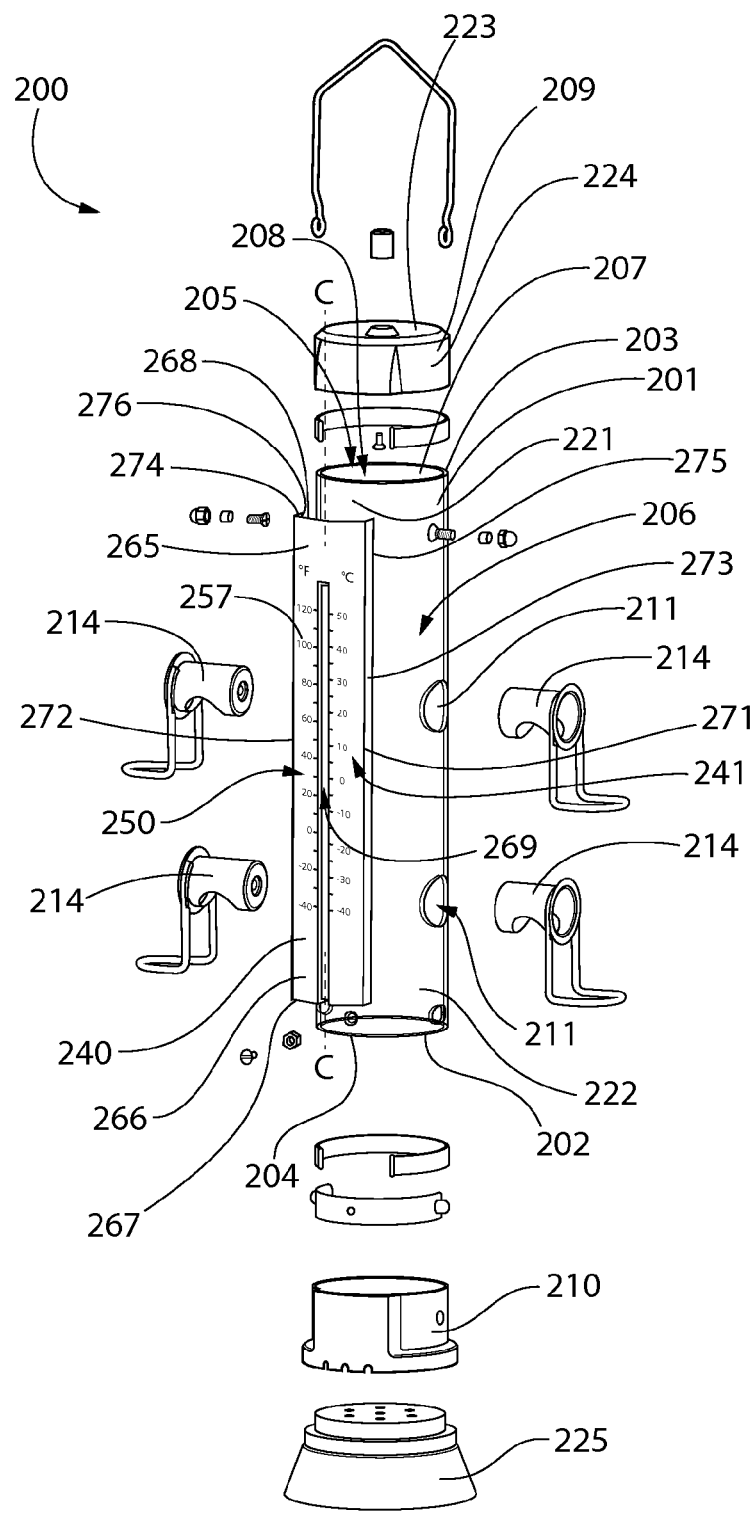
FIG. 13 is an exploded view of the birdfeeder of FIG. 11.

In the exemplified embodiment the tubular housing 101 has a length L1 measured from the bottom edge 102 of the tubular housing 101 to the top edge 103 of the tubular housing 101. Furthermore, the plate 140 has a length L2 measured from a bottom edge 144 of the plate 140 to a top edge 145 of the plate 140. In the exemplified embodiment, the length L2 of the plate is less than the length L1 of the tubular housing 101. Thus, in the exemplified embodiment the first chamber 170 is transversely aligned with a first portion P1 of the second chamber 180 and a second portion P2 of the second chamber 180 extends between the top edge 145 of the plate 140 and the top edge 103 of the tubular housing 101. However, the invention is not to be so limited in all embodiments and the plate 140 may be made to have a length that extends the entire length of the tubular housing 101 in other embodiments as desired (see, for example, the embodiment depicted in FIG. 11 and discussed in more detail below).

The plate 140 comprises an indicia portion 154, a top portion 155 and a bottom portion 156. The indicia portion 154 is a flat planar portion of the plate 140. The top and bottom portions 155, 156 of the plate 140 are angled relative to the indicia portion 154 so that the uppermost edge of the top portion 155 and the lowermost edge of the bottom portion 156 are in contact with the inner surface 107 of the tubular housing 101 (in the exemplified embodiment, the contact is between the gasket 153 and the inner surface 107 of the tubular housing 101, but if the gasket 153 is omitted the plate 140 may directly contact the inner surface of the tubular housing 101).

In certain embodiments, the angle between the top and bottom portions 155, 156 and the indicia portion 154 is between about 130° and 140°. Of course, other angles can be used, such as an angle between 45° and 160°, and more specifically between 90° and 145°. Due to this angle and the tube-like shape of the tubular housing 101, the gasket 153 (when the gasket 153 is used, which it need not be used in all embodiments as discussed above) is able to be in abutting contact with the inner surface 107 of the tubular housing 101 around an entirety of the perimeter of the plate 140. Thus, as will be better understood from the discussion of FIGS. 8-10 below, the gasket 153 seals the plate 140 against the inner surface 107 of the tubular housing 101 to prevent food substances from getting into the first chamber 170 between the first major surface 141 of the plate 140 and the first portion 171 of the inner surface 107 of the tubular housing 101. Thus, sealing the plate 140 against the inner surface 107 of the tubular housing 101 prevents the food substance from blocking the view of the first major surface 141 of the plate 140 and ensures that the first major surface 141 of the plate 140 is viewable to a user viewing the plate 140 from the exterior.

The birdfeeder 100 also includes a gauge mechanism 150 for measuring a desired standard. In the exemplified embodiment, the gauge mechanism 150 is coupled to the first major surface 141 of the plate 140. Thus, because the first major surface 141 of the plate 140 can not be blocked from viewing by the food substance, the gauge mechanism 150 is always visible to a user. The gauge mechanism 150 can be any mechanism that measures a standard, such as a weather standard including temperature, humidity, rainfall, future weather forecast, barometric pressure, wind speed and direction and the like. However, in the exemplified embodiment the gauge mechanism 150 is any mechanism that can be used to measure temperature, as will be discussed in more detail below.

In the exemplified embodiment, the gauge mechanism 150 measures temperature. In that regard, the gauge mechanism 150 comprises a temperature sensor 152 that is coupled to the first major surface 141 of the plate 140 and indicia markings 157 that are provided on the first major surface 141 of the plate 140. The temperature sensor 152 may be coupled to the first major surface 141 of the plate 140 by any means known in the art, such as an interference fit, a tight fit, staples, anchors, fasteners, adhesion (glue and/or tape) or the like. The indicia markings can be any type of indicia, numbering or other markings provided on the plate 140 to enable a user to decipher the temperature. In the exemplified embodiment, the plate 140 includes indicia for both Fahrenheit temperature readings and Celsius temperature readings (see FIG. 4). In such embodiments, the Fahrenheit temperature indicia or numbering can be listed on a first side of the first major surface 141 of the plate 140, the Celsius temperature indicia or numbering can be listed on a second side of the first major surface 141 of the plate 140, and the temperature sensor 152 can be positioned in between the Fahrenheit and Celsius temperature indicia. Any other desired indicia can be included on the plate 140, such as manufacturer information, product use information or the like.

The temperature sensor 152 is the device upon which some physical change occurs with changes in temperature. In the exemplified embodiment, the temperature sensor 152 is a glass tube containing a liquid that expands and contracts (i.e., undergoes a change in volume) within the glass tube in response to temperature changes. The liquid can be mercury, alcohol with a dye or the like as is commonly used in non-digital, bulb-type thermometers. A user can determine the temperature at the location of the birdfeeder 100 by viewing the level of the liquid within the glass tube of the temperature sensor 152 in conjunction with the indicia markings 157. Of course, any other type of temperature sensor commonly known in the art can be used.

The plate 140 is affixed or secured to the tubular housing 101. In the exemplified embodiment, the plate 140 is secured to the tubular housing 101 with one or more screws 158. However, the invention is not to be so limited and the plate 140 can be secured to the tubular housing 101 using other means, such as fasteners, hook and loop, adhesive or the like.

Referring to FIGS. 6-10, the birdfeeder 100, and specifically the arrangement of the plate 140 in the tubular housing 101 to divide the internal cavity 108 into the first chamber 170 and the second chamber 180, will be further described. As discussed in detail above, the plate 140 divides the internal cavity 108 of the tubular housing 101 into a first chamber 170 and a second chamber 180. In the exemplified embodiment, the perimetric edge 143 of the plate 140 (or the gasket 153 when included) contacts the inner surface 107 of the tubular housing 101 around the entirety of the perimetric edge 143 to separate the first and second chambers 170, 180 from one another. Of course, in some embodiments there may be gaps between the perimetric edge 143 of the plate 140 and the inner surface 107 of the tubular housing 101 and the two chambers may still be formed. Specifically, even with gaps as noted above the first and second chambers 170, 180 may still be separate so long as food substances are unable to penetrate into the first chamber 170 (such as by ensuring that the gaps are smaller than the size of the food substance particles). Furthermore, in some embodiments the bottom portion of the plate 140 may not be sealed against the inner surface 107 of the tubular housing 101. However, food substances may still be prevented from entering into the first chamber 170 by positioning the bottom portion of the plate 140 at the bottom edge 102 of the tubular housing 101.

When it is desired to add a food substance to the internal cavity 108, the first cap 109 is removed from the tubular housing 101 as discussed above to expose the top opening 105 in the top end of the tubular housing 101 (of course, the second cap 110 can alternatively be removed for the insertion of the food substance via the bottom opening 104). After removal of the first cap 109, a food substance 199 (see FIG. 7) is poured or otherwise inserted into the internal cavity 108 through the top opening 105.

When the food substance 199 is inserted into the internal cavity 108, the food substance 199 fills the second chamber 180 that is located between the second major surface 142 of the plate 140 and the second portion 181 of the inner surface 107 of the tubular housing 101. However, the plate 140 prevents the food substance 199 from entering into the first chamber 170 that is located between the first major surface 141 of the plate 140 and the first portion 171 of the inner surface 107 of the tubular housing 101 (see FIG. 7 for an illustration of the second chamber 180 filled with the food substance 199 and the first chamber 170 devoid or free of the food substance 199). Because the first chamber 170 remains free of the food substance 199 and because the gauge mechanism 150 is positioned on the first major surface 141 of the plate 140, the gauge mechanism 150 is freely visible to a viewer of the birdfeeder 100. Furthermore, in certain embodiments the tubular housing 101 is transparent at least in the region of the first portion 171 of the inner surface 107 (i.e., the portions of the tubular housing 101 that permit viewing of the gauge mechanism 150), although in some embodiments the entirety of the tubular housing 101 may be transparent as discussed above.

As a result, the first major surface 141 of the plate 140 (and also the gauge mechanism 150 provided thereon) remains visible even when the birdfeeder 100 is filled with the food substance 199, and thus a user can read the temperature (or other desired standard) on the gauge mechanism 150 regardless of whether the food substance 199 is in the birdfeeder 100 or not.

Thus, using the techniques discussed herein, a combination birdfeeder and gauge mechanism (i.e., thermometer or the like) can be created that ensures that the gauge mechanism is always visible to a user. More specifically, a combination tube-type bird feeder and gauge mechanism can be created whereby the gauge mechanism is positioned within the tube and separates the inner cavity of the tube into a first chamber and a second chamber, such that bird seed cannot enter into the second chamber and block a user's view of the gauge mechanism.

Referring now to FIGS. 11-17, a birdfeeder 200 will be described in accordance with a second embodiment of the present invention. Many features of the birdfeeder 200 are similar to the components of the birdfeeder 100 described above, and thus a similar numbering scheme will be used. Specifically, features of the birdfeeder 200 that are similar to a feature of the birdfeeder 100 will be similarly numbered except that the 200-series of numbers will be used. Furthermore, some features may be numbered and not described herein, it being understood that the description of that feature above with regard to the birdfeeder 100 applies.

The birdfeeder 200 generally comprises a tubular housing 201 having an outer surface 206 and an inner surface 207 that defines an internal cavity 208. The tubular housing 201 extends along a longitudinal axis B-B from a bottom edge 202 to a top edge 203. The tubular housing 201 has a top opening 205 formed at the top edge 203 and a bottom opening 204 formed at the bottom edge 202. The tubular housing 201 also comprises openings 211 that form feed puns and feed inserts 214 that are similar to those same features described above with regard to the birdfeeder 100.

The birdfeeder 200 also comprises a first collar 209 that is removably couplable to a top portion 221 of the tubular housing 201 and a second collar 210 that is removably couplable to a bottom portion 222 of the tubular housing 201. The first collar 209 has a roof portion 223 that encloses the top opening 205 of the tubular housing 201 and an annular sidewall 224 that fits around the top portion 221 of the tubular housing 201 when the first collar 229 is coupled to the tubular housing 201. In the exemplified embodiment the second collar 210 has an opening at both of its opposing ends and thus the second collar 210 does not enclose the bottom opening 204 of the tubular housing 201. However, the birdfeeder 200 further comprises a base portion 225 that is removably couplable to the second collar 210. The base portion 225 encloses the bottom end of the tubular housing 201 so that food substances positioned within the internal cavity 208 do not fall through the bottom opening 204 of the tubular housing 201 when the birdfeeder 200 is hanging from a tree limb or otherwise.

Figure 14A:
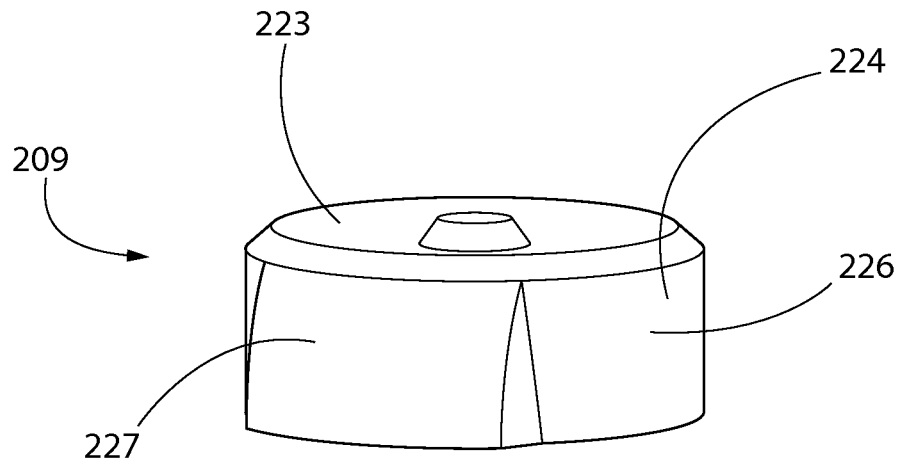
FIG. 14A is a perspective view of a first collar of the birdfeeder of FIG. 12.
Figure 14B:
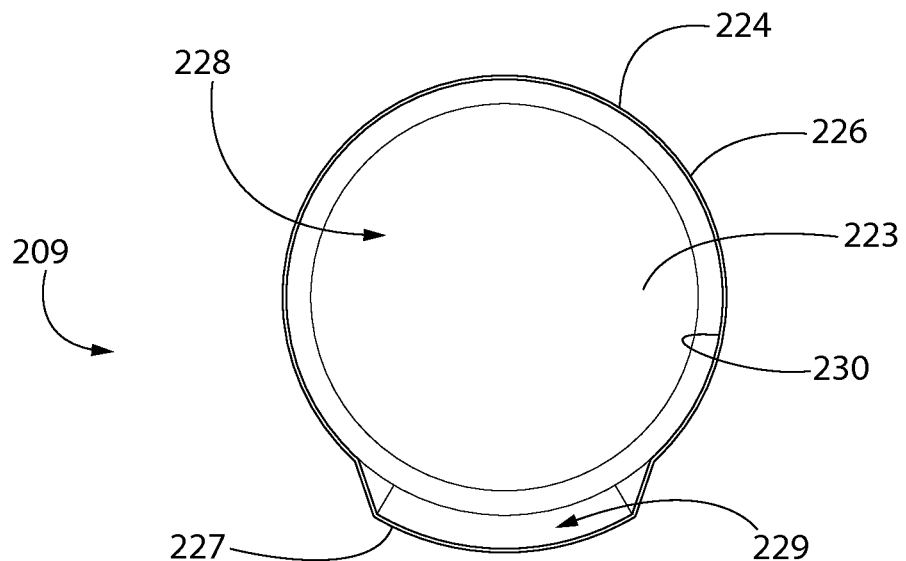
FIG. 14B is a bottom view of the first collar of FIG. 14A.

Referring briefly to FIGS. 14A and 14B, the first collar 209 will be described in more detail. As noted above, the first collar 209 includes the roof portion 223 and an annular sidewall 224 that extends from the roof portion 223. The annular sidewall 224 of the first collar 209 has an annular portion 226 and a protruding portion 227 that extends from the annular portion 226. Thus, the first collar 209 has a first chamber 228 that is formed by the annular portion 226 of the annular sidewall 224 and a second chamber 229 that is formed by the protruding portion 227 of the annular sidewall 224. In the exemplified embodiment the first and second chambers 228, 229 are in spatial communication with one another to form a single cavity that is defined by an inner surface 230 of the annular sidewall 224. However, the invention is not to be so limited and in certain other embodiments the first collar 209 may include a divider wall that spatially separates or isolates the first and second chambers 228, 229 from each other in other embodiments.

Figure 15A:
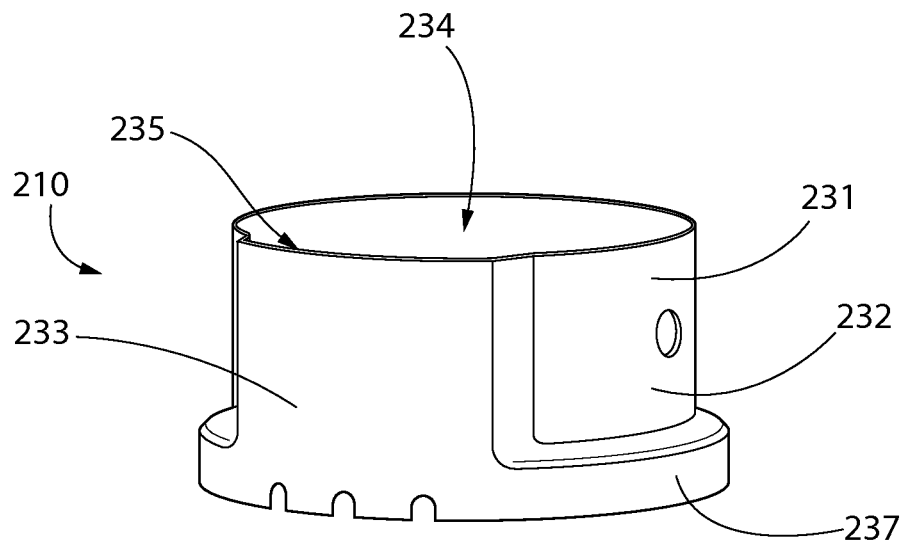
FIG. 15A is a perspective view of a second collar of the birdfeeder of FIG. 12.
Figure 15B:
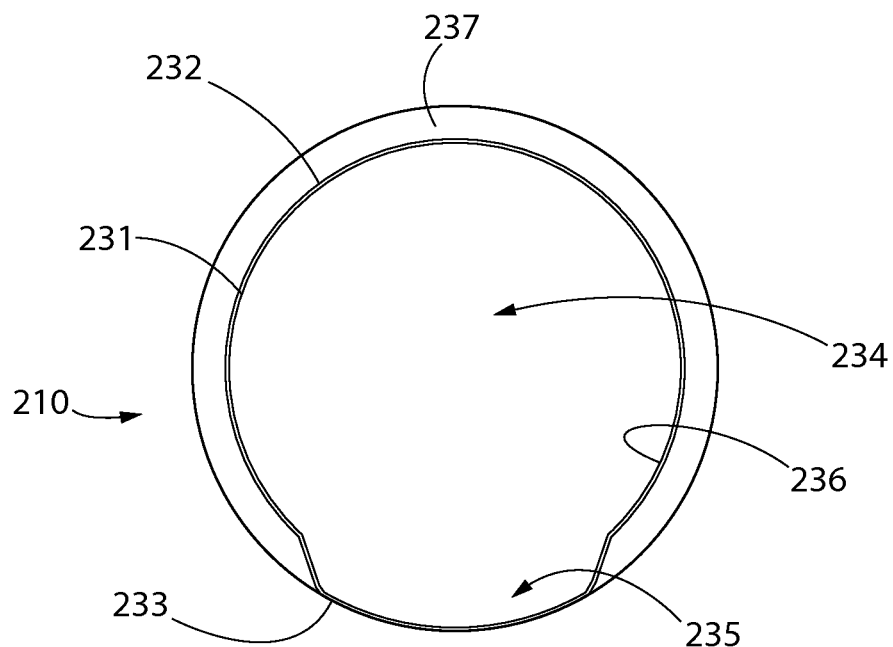
FIG. 15B is a top view of the second collar of FIG. 15A.
Figure 16:
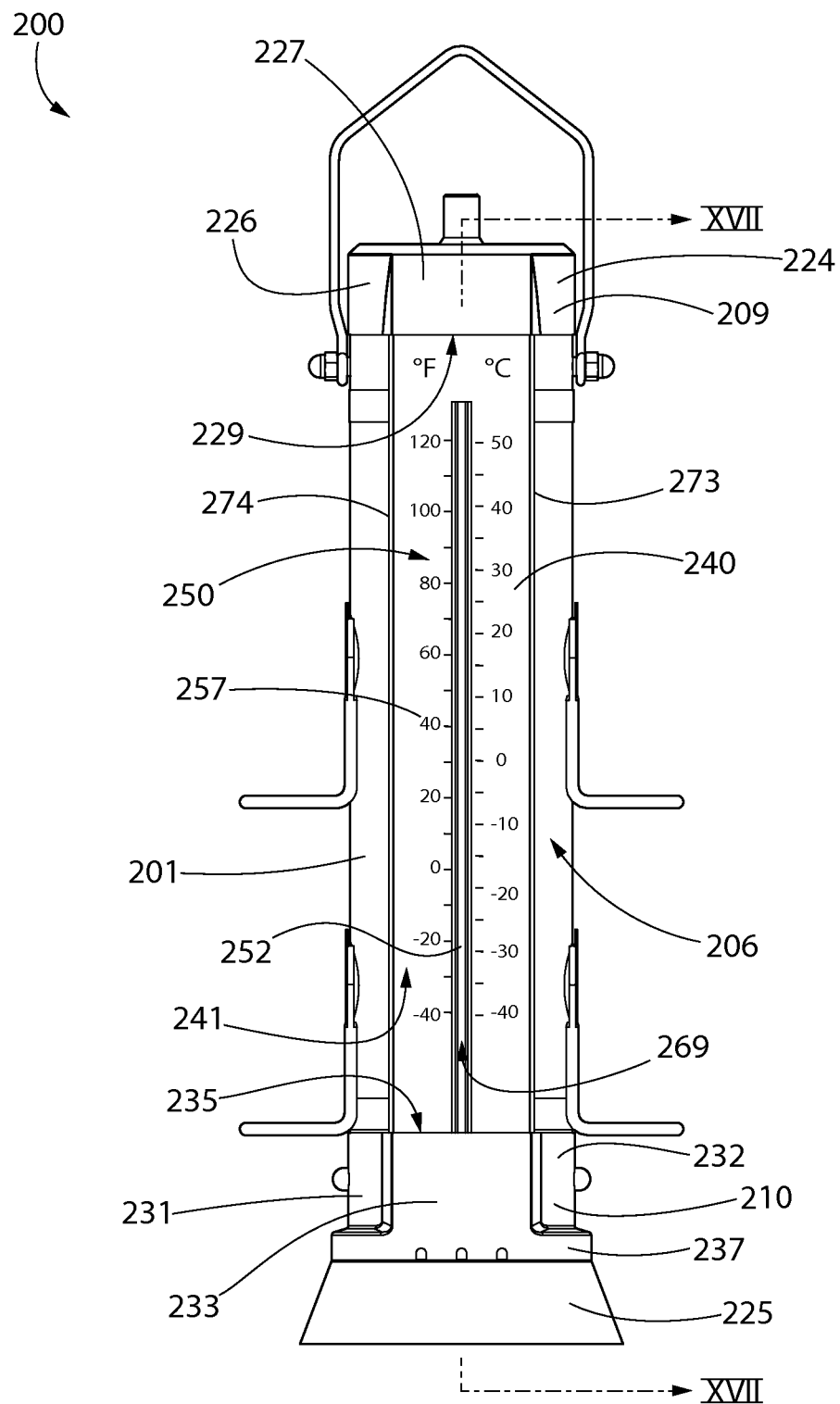
FIG. 16 is a front view of the birdfeeder of FIG. 11.
Figure 17:
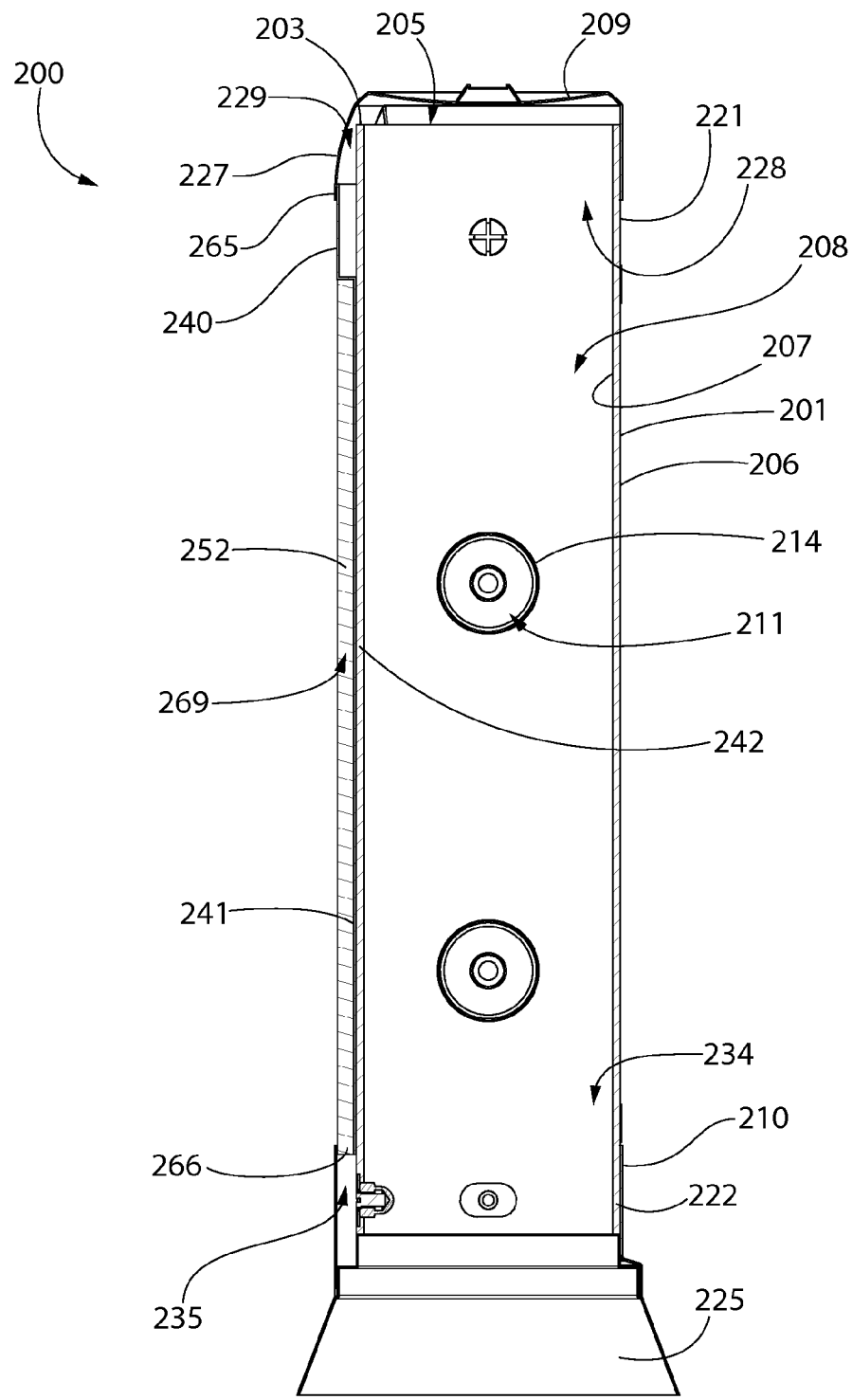
FIG. 17 is a cross-sectional view taken along line XVII-XVII of FIG. 16.

Referring briefly to FIGS. 15A and 15B, the second collar 210 will be described in more detail. As noted above, the second collar 210 is open at both ends thereof, and thus the second collar 210 merely includes an annular sidewall 231. Of course, the second collar 210 can also include a roof to enclose the bottom end of the tubular housing 201 in other embodiments if so desired. The annular sidewall 231 of the second collar 210 has an annular portion 232 and a protruding portion 233 that extends from the annular portion 232. Thus, the second collar 210 has a first chamber 234 that is formed by the annular portion 232 of the annular sidewall 231 and a second chamber 235 that is formed by the protruding portion 233 of the annular sidewall 231. In the exemplified embodiment the first and second chambers 234, 235 are in spatial communication with one another to form a single cavity that is defined by an inner surface 236 of the annular sidewall 231. However, the invention is not to be so limited and in certain other embodiments the second collar 210 may include a divider wall that spatially separates or isolates the first and second chambers 234, 235 from each other in other embodiments.

The second collar 210 also includes an annular flange 237 at its bottom end. The annular flange 237 is sized and shaped to fittingly cooperate with the base portion 225 to couple the second collar 210 to the base portion 225 via an interference fit arrangement.

The first collar 209 is coupled to the tubular housing 201 so that the top portion 221 of the tubular housing 201 is positioned within the first chamber 228 of the first collar 209. The second chamber 229 of the first collar 209 remains empty and is located between the inner surface 230 of the first collar 209 at the protruding portion 227 of the annular sidewall 224 of the first collar 209 and the outer surface 206 of the tubular housing 201. The second collar 210 is coupled to the tubular housing 201 so that the bottom portion 222 of the tubular housing 201 is positioned within the first chamber 234 of the second collar 210. The second chamber 235 of the second collar 210 remains empty and is located between the inner surface 236 of the second collar 210 at the protruding portion 233 of the annular sidewall 231 of the second collar 210 and the outer surface 206 of the tubular housing 201. The first and second collars 209, 210 should be oriented so that the second chamber 229 of the first collar 209 is longitudinally aligned with the second chamber 235 of the second collar 210.

The birdfeeder 200 also comprises a plate 240 having a first major surface 241 and an opposing second major surface 242. The plate 240 is coupled to the tubular housing 201 in a manner that will be discussed below so that the second major surface 242 of the plate 240 is adjacent to the outer surface 206 of the tubular housing 201 and the first major surface 241 of the plate 240 is exposed for viewing. Specifically, the plate 240 is coupled to the tubular housing 201 by inserting a top portion 265 of the plate 240 into the second chamber 229 of the first collar 209 and inserting a bottom portion 266 of the plate 240 into the second chamber 235 of the second collar 210.

The plate 240 extends along a longitudinal axis C-C from a bottom edge 267 of the plate 240 to a top edge 268 of the plate 240. Furthermore, in the exemplified embodiment the first major surface 241 of the plate 240 is convex and the second major surface 242 of the plate 240 is concave. This curvature of the plate 240 allows the plate 240 to follow the curvature of the outer surface 206 of the tubular housing 201 which allows for a closer coupling between the plate 240 and the tubular housing 201. Furthermore, the plate 240 has an elongated groove 269 that is formed into the first major surface 241 of the plate 240. In the exemplified embodiment, the elongated groove 269 extends longitudinally from the bottom edge 237 of the plate 240 to a position that is spaced apart from the top edge 268 of the plate 240.

The plate 240 also comprises a first side edge 271 and an opposing second side edge 272, each of the first and second side edges 271, 272 extending between the first and second major surfaces 241, 242 of the plate 240. Furthermore, the plate 240 includes a first sidewall 273 extending from the first side edge 271 in a direction away from the second major surface 242 of the plate 240 and a second sidewall 274 extending from the second side edge 272 in a direction away from the second major surface 242 of the plate 240. The first sidewall 273 terminates in a first free edge 275 and the second sidewall 274 terminates in a second free edge 276. When the plate 240 is positioned within the second chambers 229, 235 of the first and second collars 209, 210, each of the first and second free edges 275, 276 is in surface contact with the outer surface 206 of the tubular housing 201.

The birdfeeder 200 also includes a gauge mechanism 250 for measuring a desired standard. The gauge mechanism 250 can be any of the devices discussed above with regard to the gauge mechanism 150 of the birdfeeder 100. However, in the exemplified embodiment the gauge mechanism 150 comprises a temperature sensor 252 that nests within the elongated groove 269 and indicia markings 257 that are provided on the first major surface 241 of the plate 240. The temperature sensor 252 can operate in the manner as discussed herein above with regard to the birdfeeder 100 and the temperature sensor 152. In the exemplified embodiment, the indicia markings 257 include indicia for both Fahrenheit temperature readings and Celsius temperature readings. In such embodiments, the Fahrenheit temperature indicia or numbering can be listed on a first side of the first major surface 241 of the plate 240, the Celsius temperature indicia or numbering can be listed on a second side of the first major surface 241 of the plate 240, and the temperature sensor 252 can be positioned in between the Fahrenheit and Celsius temperature indicia. Any other desired indicia can be included on the plate 240, such as manufacturer information, product use information or the like.

The birdfeeder 200 can be assembled as described herein below. The assembly will be described with regard to the second collar 210 being coupled to the tubular housing 201 before the first collar 209 is coupled to the tubular housing 201. However, in other embodiments the assembly can be reversed and the first collar 209 can be coupled to the tubular housing 201 before the second collar 210 is coupled to the tubular housing 201.

Thus, during assembly first the second collar 210 is coupled to the tubular housing 201 by inserting the bottom portion 222 of the tubular housing 201 into the first chamber 234 of the second collar 210. If desired, the base portion 225 may be coupled to the second collar 210 either before or after the second collar 209 is coupled to the tubular housing 210. After the second collar 210 is coupled to the bottom portion 222 of the tubular housing 201, the plate 240 is inserted into the second chamber 235 of the second collar 210 so that the bottom portion 266 of the plate 240 is positioned within the second chamber 235 of the second collar 210. Next, the first collar 209 is coupled to the tubular housing 201 by inserting the top portion 221 of the tubular housing 201 into the first chamber 228 of the first collar 209. The first collar 209 may remain coupled to the tubular housing 201 by an interference fit or the like. When coupling the first collar 209 to the tubular housing 201, it must be ensured that the second cavity 229 of the first collar 209 is aligned with the top portion 265 of the plate 240 so that the top portion 265 of the plate 240 enters into the second chamber 229 of the first collar 209 simultaneously with the top portion 221 of the tubular housing 201 being inserted into the first chamber 228 of the first collar 209. Once both of the first and second collars 209, 210 are coupled to the tubular housing 201 and to the plate 240, the plate 240 is secured in place by being positioned within both the second chamber 229 of the first collar 209 and the second chamber 235 of the second collar 210.

Thus, when properly assembled the top portion 221 of the tubular housing 201 is positioned within the first chamber 228 of the first collar 209 and the top portion 265 of the plate 240 is positioned within the second chamber 229 of the first collar 209. More specifically, the top portion 265 of the plate 240 is positioned between the inner surface 230 of the protruding portion 227 of the first collar 209 and the outer surface 206 of the tubular housing 201. Furthermore, the bottom portion 222 of the tubular housing 201 is positioned within the first chamber 234 of the second collar 210 and the bottom portion 266 of the plate 240 is positioned within the second chamber 235 of the second collar 210. More specifically, the bottom portion 266 of the plate 240 is positioned between the inner surface 236 of the protruding portion 233 of the second collar 210 and the outer surface 206 of the tubular housing 201. Thus, the first and second collars 209, 210 are used to couple the plate 240 to the tubular housing 201.

Thus, using the components described herein, the birdfeeder 200 comprises the tubular housing 201 and the plate 240 having a gauge mechanism 250 thereon coupled to the tubular housing 201. More specifically, the first major surface 241 of the plate 240, which has the gauge mechanism 250 thereon, is positioned on the exterior of the tubular housing 201 so that it is always visible to a user who desires to read the gauge mechanism 250 to determine the temperature, humidity, or other desired standard. The first and second collars 209, 210 assist with retaining the plate 240 with the gauge mechanism 250 thereon to the exterior of the tubular housing 201. The birdfeeder 200 differs from the birdfeeder 100 in that the plate 240 is exterior to the internal cavity 208. However, with both birdfeeders 100, 200, the desired standard can be read regardless of whether the birdfeeder 100, 200 is filled with a food substance or not.

Figure 18:
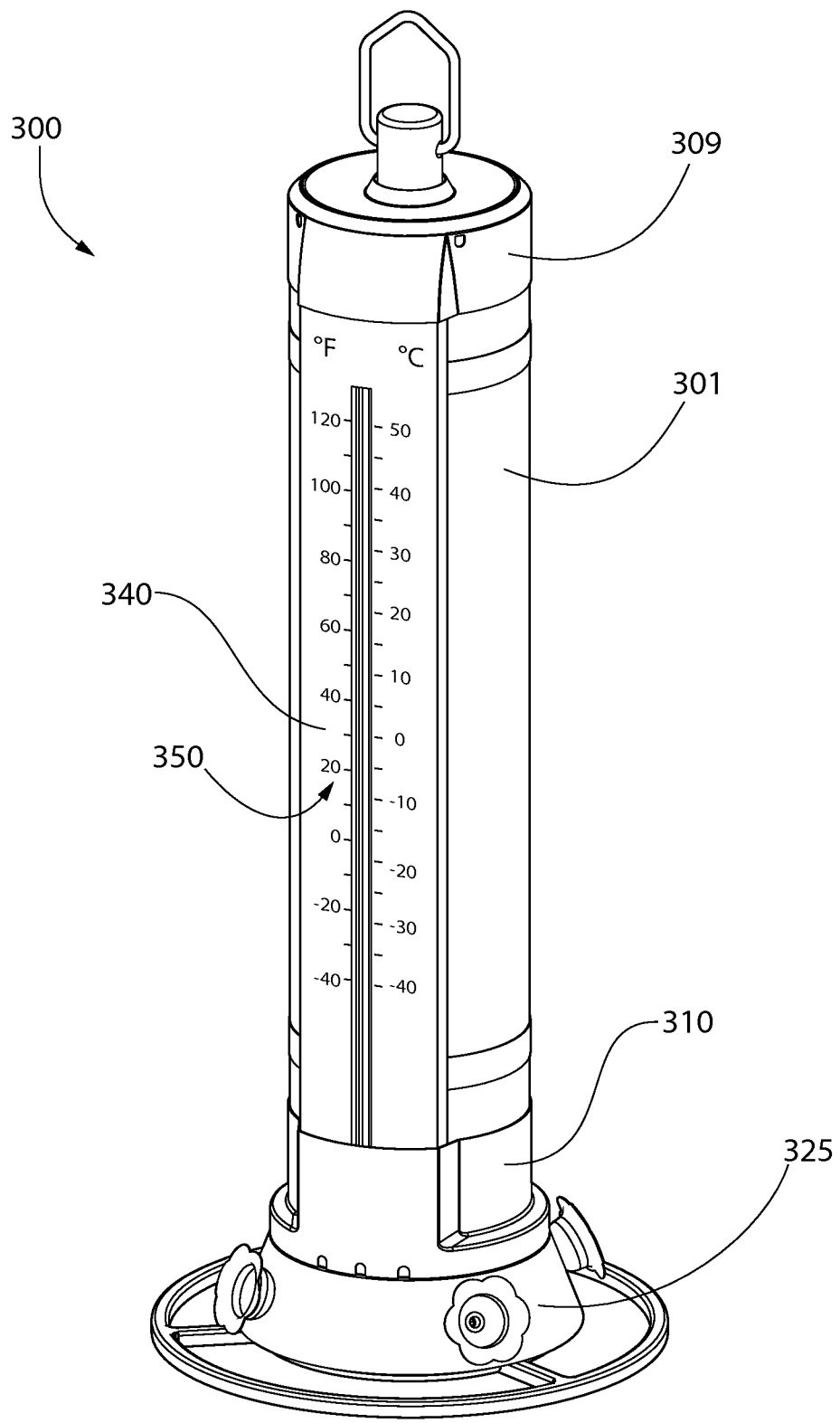
FIG. 18 is a front top perspective view of a birdfeeder in accordance with a third embodiment of the present invention.
Figure 19:
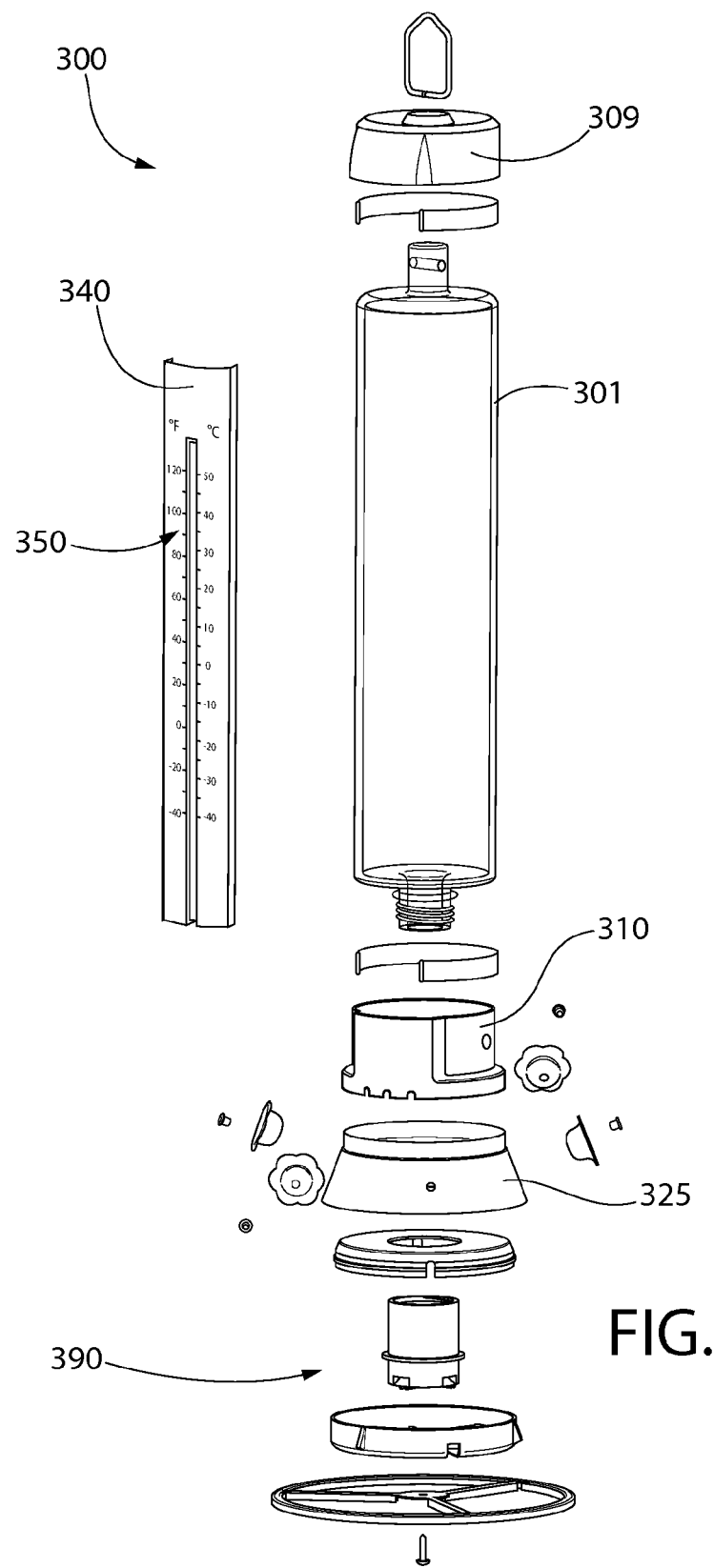
FIG. 19 is an exploded view of the birdfeeder of FIG. 18.

Referring to FIGS. 18 and 19 concurrently, a birdfeeder 300 will be described in accordance with a third embodiment of the present invention. Many features of the birdfeeder 300 are similar to the components of one of the birdfeeders 100, 200 described above, and thus a similar numbering scheme will be used. Specifically, features of the birdfeeder 200 that are similar to a feature of one of the birdfeeders 100, 200 will be similarly numbered except that the 300-series of numbers will be used. Furthermore, some features may be numbered and not described herein, it being understood that the description of that feature above with regard to one of the birdfeeders 100, 200 applies.

More specifically, the birdfeeder 300 is very similar to the birdfeeder 200, except that the birdfeeder 300 is one which is intended to retain a liquid or fluid-type food substance therein, such as nectar that is used for feeding hummingbirds. Thus, the birdfeeder 300 is one which is typically used as a hummingbird feeder. The birdfeeder 300 generally comprises a tubular housing 301, a first collar 309, a second collar 310, a base portion 325 and a basin 390. The birdfeeder 300 also includes a plate 340 having a gauge mechanism 350 thereon. The first and second collars 309, 310 and the plate 340 are substantially identical to the first and second collars 209, 210 and the plate 240 described above, and thus no further description of them will be had. Thus, the inventive features of the birdfeeder 300 are the same as those for the birdfeeder 200 except that the birdfeeder 200 may be used to retain granular or solid-type food substances and the birdfeeder 300 may be used to retain liquid-type food substances.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A birdfeeder apparatus comprising:
a tubular housing extending along a longitudinal axis, the tubular housing having an inner surface that defines an internal cavity;
a plate having a first major surface and an opposing second major surface positioned within the internal cavity, the plate dividing the internal cavity into a first chamber that is formed by the first major surface of the plate and a first portion of the inner surface of the tubular housing and a second chamber that is formed by the second major surface of the plate and a second portion of the inner surface of the tubular housing;
a gauge mechanism for measuring a desired standard coupled to the first major surface of the plate; and
wherein a food substance that is inserted into the internal cavity enters into the second chamber and is prevented from entering into the first chamber.

2. The birdfeeder apparatus of claim 1 wherein a perimetric edge of the plate is in surface contact with the inner surface of the tabular housing to isolate the first chamber from the second chamber.

3. The birdfeeder apparatus of claim 2 further comprising a gasket coupled to the plate along the perimetric edge of the plate, and wherein the gasket is in surface contact with the inner surface of the tubular housing.

4. The birdfeeder apparatus of claim 1 wherein the tubular housing has a length measured from a bottom edge of the tubular housing to a top edge of the tubular housing and wherein the plate has a length measured horn a bottom edge of the plate to a top edge of the plate, and wherein the length of the plate is less than the length of the tubular housing.

5. The birdfeeder apparatus of claim 4 wherein the first chamber is transversely aligned with a first portion of the second chamber, a second portion of the second chamber extending between the top edge of the plate and the top edge of the tubular housing.

6. The birdfeeder apparatus of claim 1 wherein the gauge mechanism measures temperature and comprises a temperature sensor that is coupled to the first major surface of the plate and indicia markings that are provided on the first major surface of the plate.

7. The birdfeeder apparatus of claim 6 wherein the indicia markings include Fahrenheit temperature markings and Celsius temperature markings, and wherein the temperature sensor is positioned between the Fahrenheit temperature markings and the Celsius temperature markings.

8. The birdfeeder apparatus of claim 1 further comprising a plurality of holes formed through the tubular housing, each of the holes forming a feeding port.

9. The birdfeeder apparatus of claim 8 wherein the plurality of holes includes first and second holes that are circumferentially spaced apart by 180° and third and fourth holes that are circumferentially spaced apart by 180°, and wherein the first and third holes are longitudinally aligned and the second and fourth holes are longitudinally aligned.

10. The birdfeeder apparatus of claim 9 wherein each of the first, second, third and fourth holes forms a passageway from an external environment into the second chamber of the internal cavity of the tubular housing.

11. The birdfeeder apparatus of claim 1 wherein the first portion of the inner surface of the tubular housing is transparent so that the gauge mechanism is visible through the tubular housing.

12. A birdfeeder apparatus comprising:
a tubular housing having an inner surface that defines an internal cavity;

a plate having a front surface and an opposing rear surface positioned within the internal cavity and dividing the internal cavity into a first chamber that is partially bounded by the front surface of the plate and a second chamber that is partially bounded by the rear surface of the plate;

a gauge mechanism for measuring a desired standard coupled to the front surface of the plate; and wherein a food substance that is inserted into the internal cavity enters into the second chamber and is prevented from entering into the first chamber.

13. The birdfeeder apparatus of claim 12 further comprising a base having at least one hole formed therethrough to form a feeding port, the tabular housing being free of holes.

14. A birdfeeder apparatus comprising:

a tubular housing extending along a longitudinal axis, the tubular housing having an inner surface that defines an internal cavity and an outer surface;

a first collar having a first chamber and a second chamber, a top portion of the tubular housing positioned within the first chamber of the first collar;

a second collar having a first chamber and a second chamber, a bottom portion of the tubular housing positioned within the first chamber of the second collar;

a plate having a first major surface and an opposing second major surface, the second major surface of the plate positioned adjacent to the outer surface of the tubular housing, a top portion of the plate positioned within the second chamber of the first collar and a bottom portion of the plate positioned within the second chamber of the second collar; and a gauge mechanism for measuring a desired standard coupled to the first major surface of the plate.

15. The birdfeeder apparatus of claim 14 wherein the gauge mechanism measures temperature and comprises a temperature sensor that is coupled to the first major surface of the plate and indicia markings that are provided on the first major surface of the plate.

16. The birdfeeder apparatus of claim 15 wherein the plate extends along a longitudinal axis from a bottom edge of the plate to a top edge of the plate, an elongated groove formed into the first major surface of the plate, the elongated groove extending longitudinally from the bottom edge of the plate to a position that is spaced from the top edge of the plate, and wherein the temperature sensor is positioned so as to nest within the elongated groove.

17. The birdfeeder apparatus of claim 14 wherein the first major surface of the plate is convex and the second major surface of the plate is concave.

18. The birdfeeder apparatus of claim 14 wherein the first and second chambers of the first collar are in spatial communication with one another to form a first cavity defined by an inner surface of the first collar and wherein the first and second chambers of the second collar are in spatial communication with one another to form a second cavity defined by an inner surface of the second collar.

19. The birdfeeder apparatus of claim 14 wherein the plate further comprises:

a first side edge and an opposing second side edge, each of the first and second side edges extending between the first and second major surfaces of the plate;

a first sidewall extending from the first side edge of the plate in a direction away from the second major surface of the plate, the first sidewall terminating in a first free edge;

a second sidewall extending from the second side edge of the plate in a direction away from the second major surface of the plate, the second sidewall terminating in a second free edge; and wherein each of the first and second free edges is in surface contact with the outer surface of the tubular housing.

20. The birdfeeder apparatus of claim 14 further comprising a plurality of holes formed through the tubular housing, each of the boles forming a passageway from an external environment into the internal cavity of the tubular housing to form a feeding port.

* * * * *